United States Patent [19]

Nishida et al.

[11] Patent Number: 5,774,620
[45] Date of Patent: Jun. 30, 1998

[54] FLUORIDE GLASS FIBER

[75] Inventors: Yoshiki Nishida; Terutoshi Kanamori, both of Mito; Tadashi Sakamoto, Yokosuka; Yasutake Ohishi; Shoichi Sudo, both of Mito, all of Japan

[73] Assignee: Nippon Telegraph and Telephone Corporation, Tokyo, Japan

[21] Appl. No.: 788,385

[22] Filed: Jan. 24, 1997

[51] Int. Cl.$^6$ ..................................................... G02B 6/00
[52] U.S. Cl. ........................ 385/141; 385/142; 385/144; 501/37
[58] Field of Search ...................... 501/37, 40; 385/141, 385/142, 144, 123

[56] References Cited

U.S. PATENT DOCUMENTS

| | | | |
|---|---|---|---|
| 5,351,335 | 9/1994 | Ohishi et al. | 385/142 |
| 5,483,628 | 1/1996 | Borrelli et al. | 385/142 |
| 5,537,505 | 7/1996 | Borrelli et al. | 385/142 |
| 5,631,194 | 5/1997 | Akella et al. | 501/37 |

FOREIGN PATENT DOCUMENTS

| | | |
|---|---|---|
| 60-155549 A | 8/1985 | Japan . |
| 07138042 A | 5/1995 | Japan . |
| 08034636 A | 2/1996 | Japan . |

OTHER PUBLICATIONS

"Preparation of Pr$^3$+–Based Fluoride Single–Mode Fibers and First Demostration of 1.3 μm Amplification", Nishida et al, Proceedings ECOC'93 19th European Optical Communication, Sep. 12, 1993, pp. 1–4.

"Efficient PDFA Module Using PbF$_2$/InF$_3$–Based Fluoride Fiber", Nishida et al, Technical Digest Optical Amplif. & Their Applications, Optic. Soc.of America, Jul. 11, 1996, P1–4.

"26 dB Amplification at 1.31 μm in a novel Pr$^3$+–Doped In F$_3$/GaF$_3$–Based Fiber", Yanagita et al, Technical Di—Digest Optical Fiber Commun., vol. 8, Feb. 26–Mar. 3, 1995, pp. 1–4.

"Optimization of Thorium–Free Indium Fluoride Glass Compositions and Application to Optical Fibers", Soufiane et al, Extended Abstracts 9th Int. Sympos.Non–Oxide Glasses (Halide Glasses), May 24–28, 1994; pp. 459–464.

"Quantum Efficiency at 1.3μm of Pr$^{3+}$ in InF$_3$ –Based Fluoride Glass", Nishida et al, Extended Abstracts (The 40th Spring Meeting, 1993); The Japan Society of Applied Physics and Related Societies, No. 0.

"Preparation of InF$_3$ –Based Fluoride Glass Fiber", Nishida et al, Extended Abstracts (THe 40th Spring Meeting, 1993); The Japan Society of Applied Physics and Related Societies, No.

"Investigation of InF$_3$ /GaF$_3$ –Based Fluoride Glass and High—n Fiber Fabrication", Nishida et al, Extended Abstracts (The 43rd Spring Meeting, 1996); The Japan Society of Applied Physics and Related Societies,, No. 3.

"Fabrication of Efficient PDFA Modul Using PbF$_2$/InF$_3$Based Fluoride Fiber", Nihida et al, Proceedings of the 1996 Electronics Society Conference of IEICE, Sep. 18, 1996.

"Preparation and Properties of ZnF$_2$ –InF$_3$ –GaF$_3$ –PbF$_2$ –LaF$_3$ Glasses", Nishii et al, Physics and Chemistry of Glasses, vol. 30, No. 2 Apr. 1980, pp. 55–58.

Primary Examiner—John Ngo
Attorney, Agent, or Firm—Spencer & Frank

[57] ABSTRACT

This invention relates to fluoride glass with a specific composition having wide infrared transmission. A fluoride optical fiber using this fluoride glass can give high efficiency with a low loss. The fluoride optical fiber having a second cladding on the outer periphery of a first cladding can adjust the refractive index of the first cladding suitably.

11 Claims, 9 Drawing Sheets

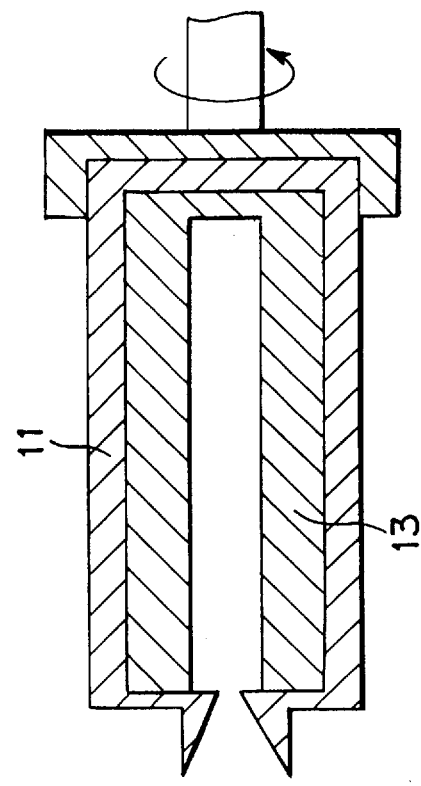
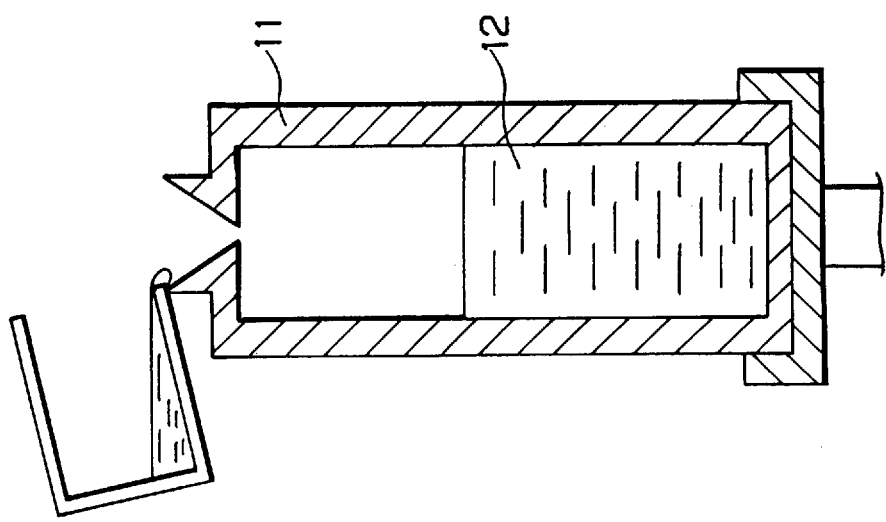
FIG. 6B
FIG. 6A

FLUORIDE GLASS FIBER

BACKGROUND OF THE INVENTION

1. Field of the Invention

This invention relates to fluoride glass having satisfactory wide infrared transmission, and a fluoride optical fiber capable of achieving highly efficient amplification using the fluoride glass.

2. Description of the Related Art

Fluoride glass has an extended transparency in regions ranging from visible to infrared wavelengths. Thus, it finds use in lenses, prisms or filters of various optical instruments, or in optical fibers for optical communication, optical measurement or power transmission. A fluoride optical fiber amplifier having a core doped with praseodymium as rare earth ions permits optical amplification in a 1.3 µm wavelength band, an important wavelength band for optical communication systems. The application of fluoride glass to an optical fiber amplifier, therefore, has drawn increased attention in recent years.

This optical amplification in the 1.3 µm wavelength band is induced by stimulated emission due to the transition from the $^1G_4$ level to the $^3H_5$ level in praseodymium. This stimulated emission is observed in a glass with low lattice vibration energy (phonon energy), such as fluoride glass, but not in a glass with high phonon energy, such as silicate glass, because of the existence of nonradiative transition attributed to multiphonon relaxation.

Therefore, it is essential to use a glass with low phonon energy such as fluoride glass to obtain such praseodymium-based optical amplification at a wavelength of 1.3 µm.

However, the quantum efficiency of amplification in the 1.3 µm band remains low, at 3.4% with $ZrF_4$-based fluoride glass which currently used as a host material of a praseodymium-doped fiber. To improve this low quantum efficiency, it is important to develop fluoride glass with lower phonon energy than that of $ZrF_4$-based fluoride glass.

The fluoride glass with low phonon energy known thus far is fluoride glass comprising 4 to 48 mol % of $ZnF_2$, 32 to 63 mol % of $PbF_2$, 0 to 34 mol % of $GaF_3$, and 0 to 43 mol % of $InF_3$, provided $GaF_3+InF_3=17$ to 53 mol %, and $ZnF_2+PbF_2+GaF_3+InF_3 \geq 70$ mol %, as Japanese Patent Application Laid-open No. 60-155549 describes.

This fluoride glass has satisfactory wide infrared transmission because of its low phonon energy. If doped with praseodymium, this fluoride glass can provide a higher quantum efficiency than does $ZrF_4$-based fluoride glass.

Owing to its insufficient thermal stability against crystallization, however, this fluoride glass cannot give a jacketing tube indispensable for the production of a single-mode fiber as will be described later herein. Thus, the use of this fluoride glass has not enabled a single-mode fiber to be produced.

We have developed $InF_3$-based fluoride glass as fluoride glass which is clearly different in the proportions of the components from the aforementioned $PbF_2$-based fluoride glass, and which has low phonon energy, as Japanese Patent Application No. 6-172499 discloses. We have also developed a fluoride fiber comprising this fluoride glass.

With a $Pr^{3+}$-doped single-mode fiber using the $InF_3$-based fluoride glass described in Japanese Patent Application No. 6-172499, the resulting gain coefficient has exceeded a gain coefficient of 0.2 dB/mW attained by the $Pr^{3+}$-doped $ZrF_4$-based fluoride fiber. However, the glass composition has not been optimized, and the optical loss of the fiber has not been sufficiently decreased. This fiber, therefore, has not achieved the maximum gain coefficient of 0.4 dB/mW expected from the spectroscopic properties of $Pr^{3+}$ contained in the $InF_3$-based fluoride glass.

SUMMARY OF THE INVENTION

The present invention has been accomplished under these circumstances. Its object is to provide fluoride glass having satisfactory wide infrared transmission, and an optical fiber for optical amplification with low loss and high efficiency.

In the first aspect of the present invention, there is provided a fluoride glass comprising 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of $LiF$, 0 to 30 mol % of $NaF$, and 0 to 15 mol % of an additive, with the total amount of all components being 100 mol %.

In the second aspect of the present invention, there is provided fluoride optical fiber having a core and a cladding, wherein the matrix of said cladding comprises 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of $LiF$, 0 to 30 mol % of $NaF$, and 0 to 15 mol % of an additive, with the total amount of all components being 100 mol %.

Here, the matrix of the core comprises 5 to 25 mol % of $InF_3$, 13 to 40 mol % of $GaF_3$, 4 to 25 mol % of $ZnF_2$, 30 to 46 mol % of $PbF_2$, 0 to 20 mol % of $CdF_2$, and 1.5 to 12 mol % of at least one member selected from the group consisting of $LaF_3$, $YF_3$, $GdF_3$ and $LuF_3$, and 0 to 15 mol % of an additive, with the total amount of all components being 100 mol %.

The matrix of the core may comprise 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of $LiF$, 0 to 30 mol % of $NaF$, and 0 to 15 mol % of an additive, with the total amount of all components being 100 mol %.

Transition metal ions or rare earth ions may be contained in the core, and the relative refractive index difference $\Delta n$ between the core and the cladding is more than 1.0%.

At least one type selected from $Ce^{3+}$, $Pr^{3+}$, $Nd^{3+}$, $Pm^{3+}$, $Sm^{3+}$, $Eu^{3+}$, $Tb^{3+}$, $Dy^{3+}$, $Ho^{3+}$, $Er^{3+}$, $Tm^{3+}$ and $Yb^{3+}$ may be contained as the rare earth ions.

In the third aspect of the present invention, there is provided a fluoride optical fiber having a core, a first cladding, and a second cladding on the outer periphery of the first cladding, wherein the matrix of the first cladding comprises 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of $LiF$, 0 to 30 mol % of $NaF$, and 0 to 15 mol % of an additive, with the total amount of all components being 100 mol %; and the matrix of the second cladding comprises 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of LiF, 0 to 30 mol % of NaF, and 0 to 15 mol % of an additive, with the total amount of all components being 100 mol %.

Here, the matrix of the second cladding comprises fluoride glass comprising at least one fluoride from $ZrF_4$ and $HfF_4$ and at least one member of the group consisting of $BaF_2$, $LaF_3$, $GdF_3$, $YF_3$, LiF, NaF, $PbF_2$ and $AlF_3$.

The refractive index of the first cladding may be adjusted such that the refractive index of the first cladding is consistent with the refractive index of the second cladding, or the refractive index of the first cladding is larger than the refractive index of the second cladding but smaller than the refractive index of the core.

Here, the adjustment of the refractive index of the first cladding may be performed by substituting part of the $PbF_2$ in the matrix of the first cladding by NaF.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 6A and 6B are schematic sectional views showing the steps in the production of a fiber perform by the rotational casting method;

DETAILED DESCRIPTION OF PREFERRED EMBODIMENTS

We have conducted extensive studies on the glass forming region of fluoride glass comprising $InF_3$, $GaF_3$, $ZnF_2$, $BaF_2$, $SrF_2$, $PbF_2$, $LaF_3$, $YF_3$, $GdF_3$, $LuF_3$, LiF and NaF. These studies have led us to discover fluoride glass having a glass forming region as described in claim 1, the fluoride glass having a glass transition temperature (about 260° C.) close to that of $ZrF_4$-based fluoride glass and high thermal stability against crystallization.

In the fluoride glass of the present invention, $InF_3$, $GaF_3$, and $ZnF_2$ are essential components constituting the network former. Desirably, the glass contains 10 to 30 mol % of $InF_3$ and 7 to 30 mol % of $GaF_3$, and preferably, 20 to 30 mol % of $InF_3$ and 7 to 20 mol % of $GaF_3$. In regions where the $InF_3$ concentration is more than 30 mol % and the $GaF_3$ concentration is less than 7 mol % in the composition of the fluoride glass of the invention, there will be obtained glass thermally stable to crystallization. However, its glass transition temperature rises to approximately 300° C., and thus a glass transition temperature close to that of $ZrF_4$-based fluoride glass cannot be achieved. In regions where the $InF_3$ concentration is less than 10 mol % and the $GaF_3$ concentration is more than 30 mol %, on the other hand, the resulting glass will have poor thermal stability against crystallization, and easy to crystallize.

The concentration of $ZnF_2$ is desirably 10 to 19 mol %. In the composition of the fluoride glass claimed in the invention, if more than 19 mol % of $ZnF_2$ is contained, single crystals of $ZnF_2$ will tend to form in the resulting glass. If its concentration is less than 10 mol %, crystals composed of $InF_3$ and $GaF_3$ will develop in the glass.

$BaF_2$ and $SrF_2$ are essential components for modifying the network former. Desirably, the glass contains 4 to 30 mol % of $BaF_2$ and 0 to 24 mol % of $SrF_2$. The $BaF_2$ concentration of 10 to 24 mol % and the $SrF_2$ concentration of 0 to 14 mol % would make it possible to obtain glass with excellent thermal stability against crystallization.

Figure 1:
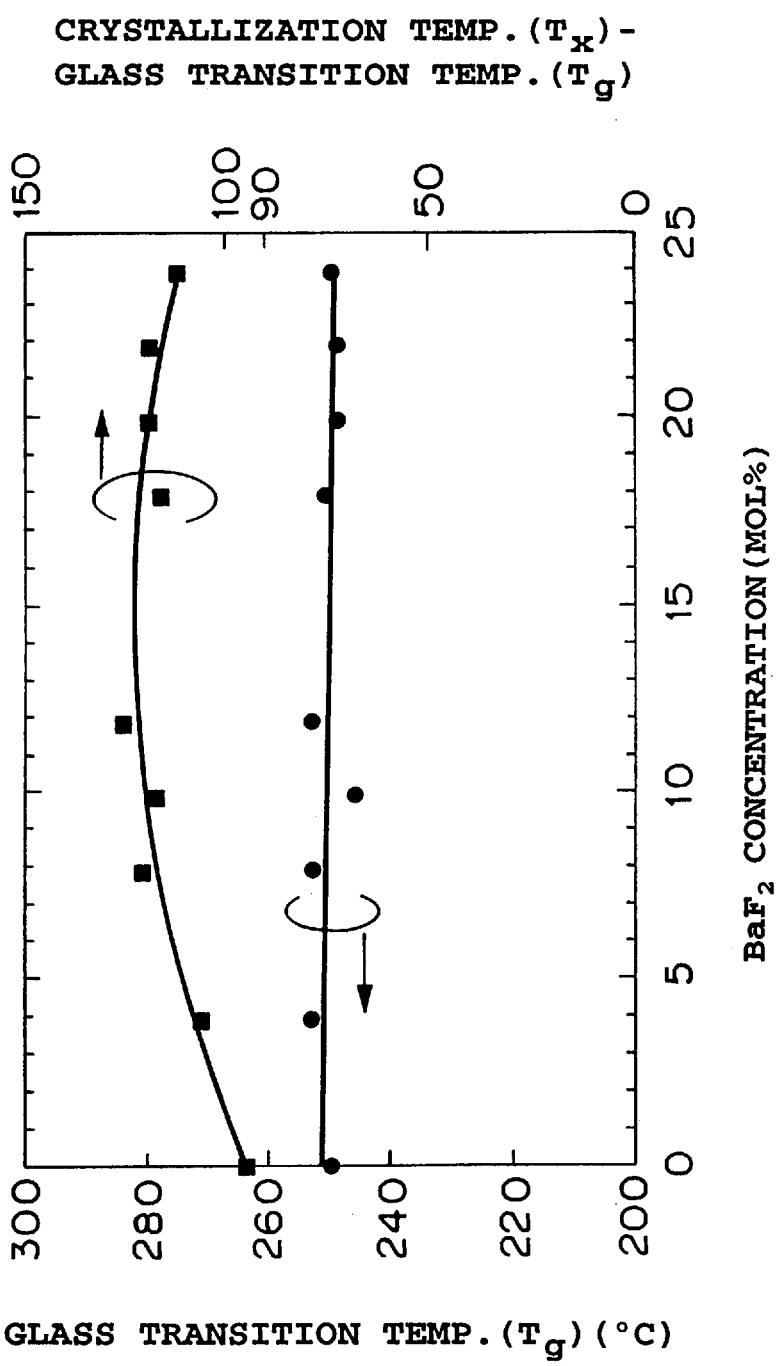
FIG. 1 is a characteristic chart showing the $BaF_2$ concentration dependence of the glass transition temperature (Tg) and (the crystallization temperature Tx–the glass transition temperature Tg) in the fluoride glass of the present invention.

FIG. 1 is a characteristic chart showing the dependence of the glass transition temperature (Tg) and (the crystallization temperature Tx–the glass transition temperature Tg) on the $BaF_2$ concentration (x mol %) in the claimed fluoride glass having the composition 28 $InF_3$-9 $GaF_3$-17 $ZnF_2$-12 $PbF_2$-x$BaF_2$-(24-x) $SrF_2$-5 $YF_3$-5 LiF (mol %). Generally, (Tx–Tg) is used as an indicator of the thermal stability of glass. In FIG. 1, the left vertical axis shows the glass transition temperature (Tg), and the right vertical axis shows (Tx–Tg), in which the value of Tg (closed circle, ●) is read from the left vertical axis, and the value of (Tx–Tg) (closed squared ■) from the right vertical axis. FIG. 1 shows that the values of Tg are close to 260° C. in the entire region with the $BaF_2$ concentration being varied from 0 to up to 24 mol %. Tx–Tg, on the other hand, shows an upwardly convex $BaF_2$ dependence. The values of Tx–Tg are high values not less than 90° C. in the region $0 \leq BaF_2 \leq 24$ mol %, especially, high values of not less than 100° C. in the region $10 \leq BaF_2 \leq 24$ mol %, namely, in the region $0 < SrF_2 \leq 14$ mol %. This is proof of possession of high thermal stability against crystallization.

LiF and NaF are also essential components for modifying the network former in the claimed fluoride glass. Incorporation of these components lowers the melting temperature of glass melt, and gives uniform glass melt even at low temperatures. Thus, their incorporation enhances the glass forming ability.

NaF is desirably contained in an amount of 0 to 30 mol %. If its concentration is more than 30 mol %, stable glass is not obtained because of a marked tendency toward crystallization. LiF is a particularly important component for ensuring the thermal stability of glass. Desirably, its concentration is 1.5 to 30 mol %, and a concentration of 5 to 10 mol %, in particular, markedly improves thermal stability against crystallization. With the concentration of more than 30 mol %, however, there will be a considerable tendency to crystallization, resulting in the failure to obtain stable glass.

In the claimed fluoride glass, $LaF_3$, $YF_3$, $GdF_3$ and $LuF_3$ are also essential components for increasing the thermal stability of the glass. Desirably, at least one of these components is contained in an amount of 1.5 to 15 mol %, preferably 1.5 to 10 mol %. If the concentration is less than 1.5 mol %, the increase in thermal stability cannot be confirmed. With the concentration of more than 15 mol %, on the other hand, there will be a marked tendency toward crystallization, resulting in the failure to obtain stable glass.

In the claimed fluoride glass, $PbF_2$ is an essential component for controlling the refractive index, and preferably, is contained within the range from 0 to 30 mol %. However, $PbF_2$ may be replaced partially, in the range of from 0 to 20 mol %, by NaF without impairing the thermal stability of the glass, whereby the refractive index of the claimed fluoride glass can be controlled.

Figure 2:
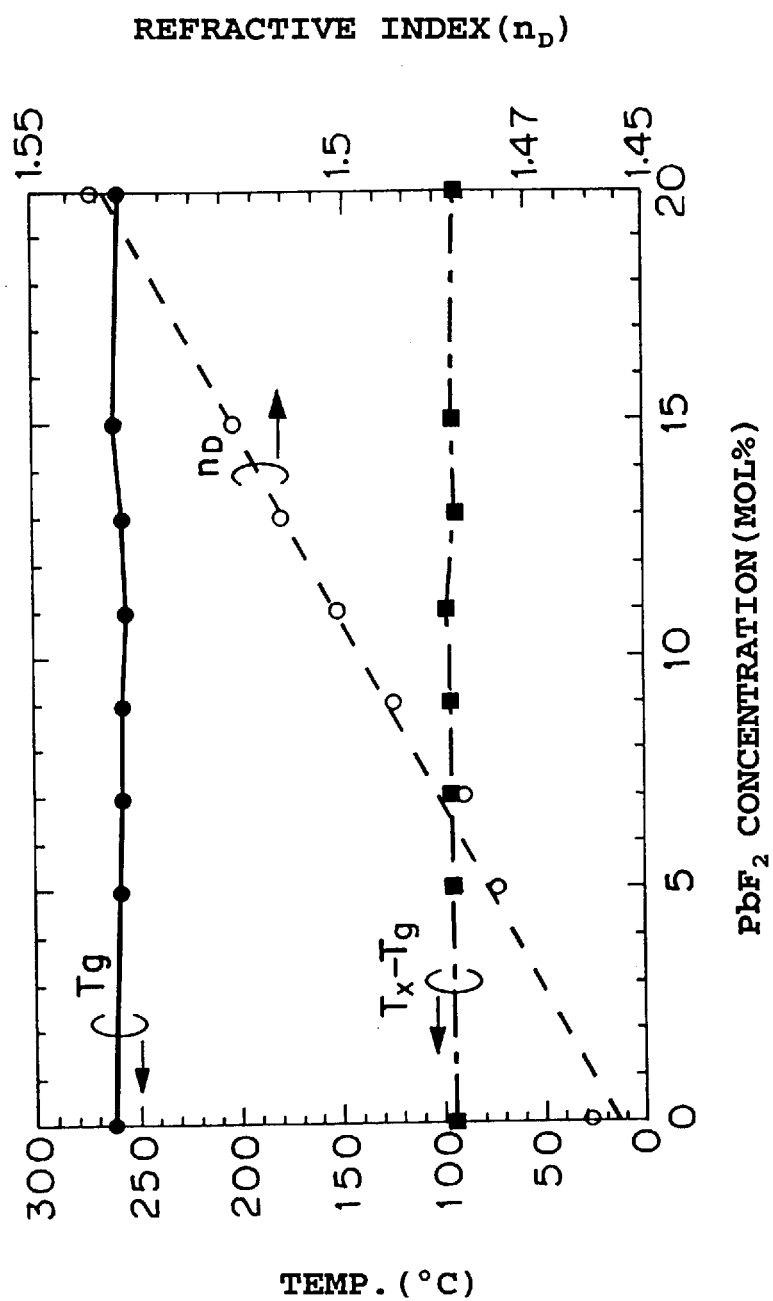
FIG. 2 is a characteristic chart showing the $PbF_2$ concentration dependence of Tg, (Tx–Tg), and the refractive index (nD) in the fluoride glass of the invention.

FIG. 2 shows the dependence of the glass transition temperature (Tg), the difference (Tx–Tg), and the refractive index nD on the $PbF_2$ concentration (x mol %) in the claimed fluoride glass having the composition 25 $InF_3$-10 $GaF_3$-14 $ZnF_2$-x$PbF_2$-18 $BaF_2$-8 $SrF_2$-2.5 $YF_3$-2.5 $LaF_3$-(20–x) (LiF+NaF) (mol %). In FIG. 2, the left vertical axis shows the temperature, and the right vertical axis shows the refractive index, in which the value of Tg (closed circle, ●) and the value of (Tx–Tg) (closed square, ■) are read from the left vertical axis, and the value of the refractive index (open circle, ○) from the right vertical axis.

FIG. 2 shows that the glass transition temperature has values close to 260° C. in the entire region with the $PbF_2$ concentration being varied from 0 to up to 20 mol %. The values of (Tx–Tg) are not less than 90° C., showing high thermal stability. The refractive index, on the other hand, increases linearly from 1.46 to 1.54 as the $PbF_2$ concentration is increased. In the claimed fluoride glass, therefore, the refractive index can be controlled, with the glass transition temperature being maintained close to 260° C. and thermal stability maintained high, by replacing part of or all of a suitable amount of $PbF_2$ by NaF.

The claimed fluoride glass and the claimed fluoride optical fiber also contain 0 to 15 mol % of an additive. As the additive, there may be contained at least one member of the group consisting of 0 to 10 mol % of $BeF_2$, 0 to 10 mol % of $MgF_2$, 0 to 10 mol % of $CaF_2$, 0 to 4 mol % of $CdF_2$, 0 to 5 mol % of $TlF_4$, 0 to 5 mol % of $MnF_2$, 0 to 5 mol % of $SmF_3$, 0 to 5 mol % of $ScF_3$, 0 to 5 mol % of $HfF_4$, 0 to 5 mol % of $ZrF_4$, 0 to 10 mol % of KF, 0 to 10 mol % of RbF, 0 to 10 mol % of CsF, 0 to 15 mol % of $BiF_3$ and 0 to 15 mol % of $AlF_3$.

Figure 3:
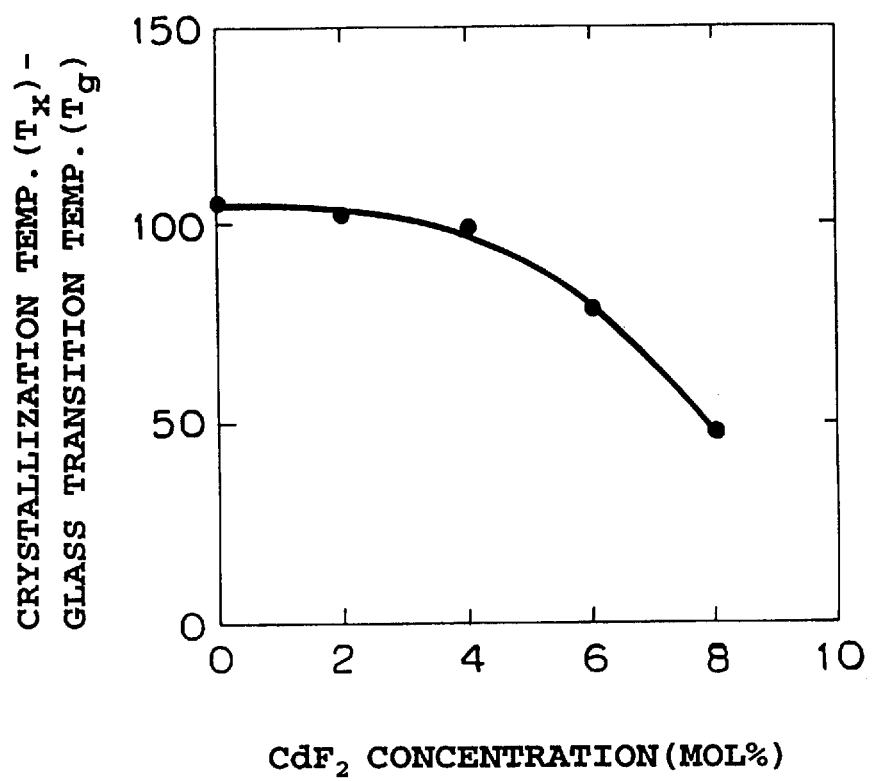
FIG. 3 is a characteristic chart showing the $CdF_2$ concentration dependence of (Tx–Tg) in the fluoride glass of the invention.

In this case, $CdF_2$ may replace part of the aforementioned essential component $ZnF_2$ or $PbF_2$, i.e. in the range of from 0 to 4 mol %. FIG. 3 shows the dependence of the value of (Tx–Tg) on the $CdF_2$ concentration (x) in the glass 28 $InF_3$-9 $GaF_3$-(15–x) $ZnF_2$-x$CdF_2$-12 $PbF_2$-18 $BaF_2$-8 $SrF_2$-5 $YF_3$-5 LiF (mol %). From FIG. 3, one can see that $CdF_2$ can be contained in the glass to a concentration of up to 4 mol % without impairing its thermal stability. With the concentration of more than 4 mol %, however, the value of (Tx–Tg) sharply decreases. In 5 mol % or more, the thermal stability of the glass is considerably impaired. Likewise, the respective elements $BeF_2$, $MgF_2$, $CaF_2$ and $MnF_2$ can replace part of each of the essential components $ZnF_2$, $PbF_2$, $BaF_2$ and $SrF_2$. Furthermore, the elements $TlF_4$, $SmF_3$, $ScF_3$, $HfF_4$ and $ZrF_4$ can replace part of each of the essential components $InF_3$, $GaF_3$, $YF_3$ and $LaF_3$. If they are contained as replacements beyond the aforementioned ranges, however, the thermal stability of the glass will be considerably deteriorated.

The fluoride optical fiber of the invention achieves highly efficient optical amplification by possessing a structure with high Δn (Δn≧1.0%). This is because the quantum efficiency of the 1.3 μm transition of praseodymium is improved by using the low phonon energy glass as a host glass and increasing the Δn of the fiber which can achieve the high light intensity in the core.

For the production of a high Δn optical fiber using the $PbF_2$-based fluoride glass described in the previously cited Japanese Patent Application No. 60-155549 as the core, the use of the known $ZrF_4$-based fluoride glass as the cladding, however, crystals consisting essentially of $PbF_2$ and $ZrF_4$ grow at the interface between the core and the cladding, making it difficult to obtain a satisfactory optical fiber.

In the fluoride fiber of the invention, by contrast, the use of the fluoride glass described in claim 1 as the cladding caused no crystallization at the interface between the core and the cladding, and enabled a satisfactory optical fiber to be obtained even when the $PbF_2$-based fluoride glass was used as the core glass. The reason is that $InF_3$ is also contained in the composition of the $PbF_2$-based fluoride glass, thus there is no rapid crystal growth having $PbF_2$ and $InF_3$ as the main components.

Additionally, it is possible, needless to say, to produce the claimed optical fiber using the fluoride glass of claim 1 as the core glass.

A single mode fluoride optical fiber has been produced by the following fabrication steps: A fluoride fiber perform having a structure comprising a core and a cladding was fabricated by suction casting. Then, the resulting fluoride fiber perform was inserted into a first jacketing tube, and elongated under heat to form a second fiber perform. The second fiber perform was reinserted into a second jacketing tube, and drawn into a single-mode optical fiber.

To produce a single-mode optical fiber, having a core capable of well confining light, by the suction casting method, the core/cladding external diameter ratio of not less than 5 is generally said to be necessary. With the above-described method of producing a single-mode fiber, however, it is impossible to prepare a fiber perform with the core/cladding ratio of not less than 5 only by the fiber perform fabrication step using suction casting.

To produce a single mode fiber with the core/cladding ratio of more than 5, therefore, a first jacketing tube, i.e. a second cladding, should desirably have the same refractive index as does the cladding (first cladding). If the second cladding has a higher refractive index than the cladding, the field of propagating light in the core extends into the cladding, which results in weakened light intensity in the core. Thus, highly efficient amplification cannot be attained.

The invented optical fiber, on the other hand, uses the claimed fluoride glass as the cladding glass. Thus, the cladding and the second cladding are consistent in terms of the refractive index, the core/cladding ratio is not less than 5, and a single mode fiber with high intensity light confined in the core can be produced.

In case no suction casting method is employed, the core/cladding ratio is not restricted to not less than 5 as far as the ratio can depress the cladding mode.

As is apparent from the cross section of a single mode fluoride fiber, the area of the core and the cladding is at most 1/16 of the total cross sectional area of the optical fiber. Most of the cross section is composed of a first jacketing tube and a second jacketing tube. Thus, the jacketing tubes account for most of the weight of the optical fiber. This means that the price of the jacketing tube determines the price of the single mode fiber.

Fluoride raw materials such as $InF_3$ and $GaF_3$ are expensive compared with $ZrF_4$. The use of $InF_3$-based fluoride glass as the jacketing tube will necessarily raise the unit price of the resulting optical fiber.

In the fluoride fiber of the invention, using $ZrF_4$-based fluoride glass as the first jacketing tube, accordingly the second cladding, the price of the resulting single mode fiber can be cut down.

When a jacketing tube of $ZrF_4$-based fluoride glass is used as the second cladding, the preparation of a satisfactory fiber with high intensity light confined in the core requires that there be agreement between the refractive index of the cladding and that of the second cladding. In the claimed fluoride fiber, the concentration of $PbF_2$, a component of the cladding glass, is partially substituted by NaF, whereby the refractive index can be varied within the range of from 1.46 to 1.54 without changing the glass transition temperature of the cladding glass. Furthermore, the glass transition temperature of the cladding glass is close to the glass transition temperature of $ZrF_4$-based fluoride glass. Consequently, even when $ZrF_4$-based fluoride glass is used as the second cladding, the fiber fabrication steps such as elongation and fiber drawing can be performed without problems. In addition, the refractive index of the cladding glass can be controlled to be equal to or greater than the refractive index of the jacketing tube, and smaller than that of the core. Thus, a satisfactory single mode fiber with high intensity light confined in the core can be produced.

In preparing an optical fiber with a relative refractive index difference ($\Delta n$) of not less than 4%, it is necessary to use as the core glass a fluoride glass with a higher refractive index than that of the claimed fluoride glass. The relative refractive index difference ($\Delta n$) is defined as follows:

$\Delta n$=(refractive index of core−refractive index of cladding)/refractive index of core (%)

Generally, fluoride glass with a high concentration of $PbF_2$ is known to be high in refractive index. Our extensive studies have led to discovery of a fluoride glass composition containing 30 to 46 mol % of $PbF_2$ and having a high refractive index close to 1.6. In the present invention, the preferred fluoride glass is one in which a core matrix comprises 5 to 25 mol % of $InF_3$, 13 to 40 mol % of $GaF_3$, 4 to 25 mol % of $ZnF_2$, 30 to 46 mol % of $PbF_2$, 0 to 20 mol % of $CdF_2$, and 1.5 to 12 mol % of at least one member selected from $LaF_3$, $YF_3$, $GdF_3$ and $LuF_3$, and 0 to 15 mol % of an additive, with the total amount of the components being 100 mol %.

In the fluoride glass for the core, $InF_3$ and $GaF_3$ are essential components as the network former. $InF_3$ is desirably contained in a concentration of 5 to 25 mol %. If its concentration is less than 5 mol %, transparent glass cannot be obtained. If the $InF_3$ concentration is more than 25 mol % in the core fluoride glass composition, a rather high crystallization rate occurs, giving no satisfactory glass. $GaF_3$ is desirably contained in a concentration of 13 to 40 mol %. If the $GaF_3$ concentration is less than 13 mol % in the core fluoride glass composition, transparent glass cannot be obtained because of crystallization. If its concentration is more than 40 mol %, the glass melt devitrifies yellow, so that transparent glass cannot be obtained, either. In the core fluoride glass, moreover, $PbF_2$ and $ZnF_2$ are essential components as network modifiers. Incorporation of these ions lowers the melting temperature of the glass melt, so that a uniform melt can be obtained at low temperatures, thus enhancing the glass forming ability. With this core fluoride glass composition, the desirable concentration of $PbF_2$ is 30 to 46 mol %. The concentration of less than 30 mol % poses difficulty in obtaining transparent glass because of crystallization. At the concentration of more than 46 mol %, the glass melt becomes volatile, and cannot provide stable glass. $ZnF_2$ is desirably contained in a concentration of 4 to 25 mol %. At a concentration of less than 4 mol %, crystallization makes it impossible to obtain transparent glass. At a concentration of more than 25 mol %, a rather high crystallization rate occurs, and does not give transparent glass, either. $CdF_2$ may be contained as substituting $PbF_2$ or $ZnF_2$ in the range of from 0 to 20 mol %. Preferably, it is contained in the range 0 to 7 mol %, thus taking effect in increasing the glass forming ability and obtaining stable glass. Furthermore, $LaF_3$, $YF_3$, $GdF_3$ or $LuF_3$ is an essential component for improving thermal stability against crystallization in the claimed fluoride glass. With the core fluoride glass composition, at least one of them is contained in a concentration of 1.5 to 12 mol %, whereby thermal stability to reheating can be improved.

Such fluoride glass is used as the core, and the invented fluoride glass claimed in claim 1 is used as the cladding, thereby making it possible to produce an optical fiber with $\Delta n$=not less than 4% that was unattainable with a conventional $ZrF_4$-based fluoride fiber.

Additionally, in preparing a single mode optical fiber with $\Delta n$=not more than 4.0%, comparable to the relative refractive index difference $\Delta n$ of an optical fiber produced using conventional $ZrF_4$-based fluoride glass, the use of the claimed fluoride glass as the core and the cladding permits the production of exactly the same optical fiber as the $ZrF_4$-based glass fiber. Moreover, the claimed fluoride glass has better infrared transmission than the $ZrF_4$-based fluoride glass. Thus, the doping of its core with rare earth ions for optical amplification enables higher amplification efficiency than that of the $ZrF_4$-based fluoride glass.

The fluoride fiber of the invention, when doped in the core with transition metal ions or rare earth ions, can be used as an optical fiber laser or an optical fiber amplifier. Examples of the doping transition metal ions are Cr, Ti, Fe, Co, Ni and Cu, whereas examples of the doping rare earth ions are Ce, Pr, Nd, Pm, Sm, Eu, Tb, Dy, Ho, Er, Tm and Yb. These doping elements can be contained in the range of from 0.001 to 10% by weight. The concentration in excess of 10 wt. % is undesirable, since this will deteriorate the thermal stability of the core glass. At the concentration of less than 0.001 wt. %, sufficient emission cannot be attained because of the intrinsic loss of the fiber, such as scattering loss.

The present invention will be described in detail with reference to the Examples, which are presented to illustrate, not limit, the invention.

EXAMPLE 1

$InF_3$, $GaF_3$, $ZnF_2$, $PbF_2$, $BaF_2$, $SrF_2$, $YF_3$, $LaF_3$, $GdF_3$, $LuF_3$, LiF and NaF, all in anhydrous form, were weighed and mixed in the proportions shown in Table 1. To each of the mixtures, 4 g of ammonium bifluoride was added, and placed in a crucible. The crucible was set in a resistivity-heated furnace, and heated for 1 hour at 900° C. in an argon atmosphere to melt the contents of the crucible. The temperature of the furnace was lowered to 700° C., and the crucible was withdrawn. The melt inside was poured into a brass mold with an outside diameter of 8 mm that had been preheated to 200° C., to quench the melt, obtaining a glass rod.

A part of the glass rod was crushed, and measured for the glass transition temperature (Tg) and the crystallization temperature (Tx) using a differential scanning calorimeter. In all of the samples, the values of Tg were close to 260° C. The value of (Tx−Tg) is known as an indicator of the thermal stability against crystallization of glass. The measurements of (Tx–Tg) for all glass samples showed values 90° C. or higher, ascertaining that the resulting glasses had high thermal stability.

A 10 mm long cylindrical rod was cut out of the glass rod, and its opposite end surfaces were polished, followed by measuring the transmission spectrum of the rod. The rod was found to have good transmission at up to 10 μm. Some of the rod samples were measured for Raman spectrum. Peaks of all measurements were noted around 500 cm$^{-1}$, showing that the resulting glass had small phonon energy.

Preparation of Core Glass Sample No. 1

Core glass of the optical fiber according to the present invention was prepared in the following manner:

InF$_3$, GaF$_3$, ZnF$_2$, PbF$_2$, YF$_3$ and LaF$_3$, all in anhydrous form, were used as raw materials, and weighed and mixed to form a batch with the glass composition 13 InF$_3$-29 GaF$_3$-12 ZnF$_2$-38 PbF$_2$-4 YF$_3$-4 LaF$_3$ (mol %). To 20 g of this batch, 4 g of ammonium bifluoride was added, followed by placing the mixture in a crucible. The crucible was set in a resistivity-heated furnace, where it was heated for 1 hour at 900° C. in an argon atmosphere to melt the contents of the

TABLE 1

| No | InF3 | GaF3 | ZnF2 | PbF2 | BaF2 | SrF2 | LaF3 | YF3 | GdF3 | LuF3 | NaF | LiF | Tg | Tx | Tx – Tg |
|----|------|------|------|------|------|------|------|-----|------|------|-----|-----|------|------|-------|
| 1  | 25.5 | 11.5 | 14   |      | 19   | 8    | 2.5  | 2.5 |      |      | 12  | 5   | 264.2 | 365.9 | 101.7 |
| 2  | 25.5 | 11.5 | 14   | 3    | 19   | 8    | 2.5  | 2.5 |      |      | 9   | 5   | 259.9 | 354.2 | 94.3  |
| 3  | 25.5 | 11.5 | 14   | 6    | 19   | 8    | 2.5  | 2.5 |      |      | 6   | 5   | 258.3 | 355.1 | 96.8  |
| 4  | 25.5 | 11.5 | 14   | 9    | 19   | 8    | 2.5  | 2.5 |      |      | 3   | 5   | 261.5 | 354   | 92.5  |
| 5  | 25.5 | 11.5 | 14   | 12   | 19   | 8    | 2.5  | 2.5 |      |      |     | 5   | 260.3 | 358   | 97.7  |
| 6  | 25.5 | 11.5 | 14   | 12   | 19   | 8    |      | 2.5 | 2.5  |      |     | 5   | 259.6 | 357.6 | 98    |
| 7  | 25.5 | 11.5 | 14   | 12   | 19   | 8    |      | 2.5 |      | 2.5  |     | 5   | 262.3 | 360.1 | 97.8  |
| 8  | 25.5 | 11.5 | 14   | 12   | 19   | 8    |      | 5   |      |      |     | 5   | 257.3 | 356.5 | 99.2  |
| 9  | 25.5 | 11.5 | 14   |      | 19   | 8    | 2.5  | 2.5 |      |      | 10  | 7   | 258.6 | 356   | 97.4  |
| 10 | 25.5 | 11.5 | 14   | 2    | 19   | 8    | 2.5  | 2.5 |      |      | 8   | 7   | 258.2 | 355.1 | 96.9  |
| 11 | 25.5 | 11.5 | 14   | 4    | 19   | 8    | 2.5  | 2.5 |      |      | 6   | 7   | 258.4 | 355.5 | 97.1  |
| 12 | 25.5 | 11.5 | 14   | 6    | 19   | 8    | 2.5  | 2.5 |      |      | 4   | 7   | 256.4 | 355.3 | 98.9  |
| 13 | 25.5 | 11.5 | 14   | 8    | 19   | 8    | 2.5  | 2.5 |      |      | 2   | 7   | 258.2 | 353.1 | 94.9  |
| 14 | 25.5 | 11.5 | 14   | 10   | 19   | 8    | 2.5  | 2.5 |      |      |     | 7   | 262.1 | 358.4 | 96.3  |
| 15 | 25.5 | 11.5 | 15   | 12   | 18   | 8    | 2.5  | 2.5 |      |      |     | 5   | 260.3 | 359.3 | 99    |
| 16 | 28   | 9    | 17   |      | 10   | 14   | 2.5  | 2.5 |      |      | 10  | 7   | 245.5 | 363.3 | 117.8 |
| 17 | 28   | 9    | 17   |      | 12   | 12   | 2.5  | 2.5 |      |      | 10  | 7   | 252.6 | 378.5 | 125.9 |
| 18 | 28   | 9    | 17   |      | 18   | 6    | 2.5  | 2.5 |      |      | 10  | 7   | 250.1 | 366   | 115.9 |
| 19 | 28   | 9    | 17   |      | 20   | 4    | 2.5  | 2.5 |      |      | 10  | 7   | 248   | 367   | 119   |
| 20 | 28   | 9    | 17   |      | 24   |      | 2.5  | 2.5 |      |      | 10  | 7   | 249   | 361   | 112   |
| 21 | 28   | 10   | 10   |      | 30   |      | 2.5  | 2.5 |      |      | 10  | 7   | 252   | 342.3 | 90.3  |
| 22 | 28   | 10   | 12   |      | 4    | 24   | 2.5  | 2.5 |      |      | 10  | 7   | 268   | 358.2 | 90.2  |
| 23 | 28   | 9    | 17   | 12   | 4    | 20   | 2.5  | 2.5 |      |      |     | 5   | 256.8 | 351.8 | 95    |
| 24 | 28   | 9    | 17   | 12   | 8    | 16   | 2.5  | 2.5 |      |      |     | 5   | 258.5 | 357.9 | 99.4  |
| 25 | 28   | 9    | 17   | 12   | 12   | 12   | 2.5  | 2.5 |      |      |     | 5   | 256   | 358.1 | 102.1 |
| 26 | 28   | 9    | 17   | 12   | 16   | 8    | 2.5  | 2.5 |      |      |     | 5   | 260.2 | 353.3 | 93.1  |
| 27 | 28   | 9    | 17   | 12   | 20   | 4    | 2.5  | 2.5 |      |      |     | 5   | 257   | 348.8 | 91.8  |
| 28 | 22   | 16   | 14   | 19   | 13   | 6    | 3    | 3   |      |      |     | 4   | 256.3 | 346.5 | 90.2  |
| 29 | 20   | 20   | 13.5 | 25   | 9    | 4    | 3    | 3   |      |      |     | 2.5 | 252   | 342.3 | 90.3  |
| 30 | 13   | 29   | 12   | 30   | 6.5  |      | 4    | 4   |      |      |     | 1.5 | 253.6 | 343.6 | 90    |
| 31 | 10   | 30   | 10   | 30   | 10.5 |      | 4    | 4   |      |      |     | 1.5 | 251   | 345   | 94    |

COMPARATIVE EXAMPLE 1

ZrF$_4$, BaF$_2$, LaF$_3$, AlF$_3$, YF$_3$ and NaF, all in anhydrous form, were used as raw materials, and weighed to form a batch with the composition 46.5 ZrF$_4$-23.5 BaF$_2$-2.5 LaF$_3$-2.5 YF$_3$-4.5 AlF$_3$-20 NaF (mol %). 20 Grams of this batch was mixed, and 4 g of ammonium bifluoride was added, followed by placing the mixture in a crucible. The crucible was heated for 1 hour at 900° C. in a resistivity-heated furnace to melt the contents of the crucible. Then, the temperature of the furnace was lowered to 700° C., and the melt inside the crucible was poured into a brass mold preheated to 240° C., to quench the melt, obtaining a glass rod.

Figure 4:
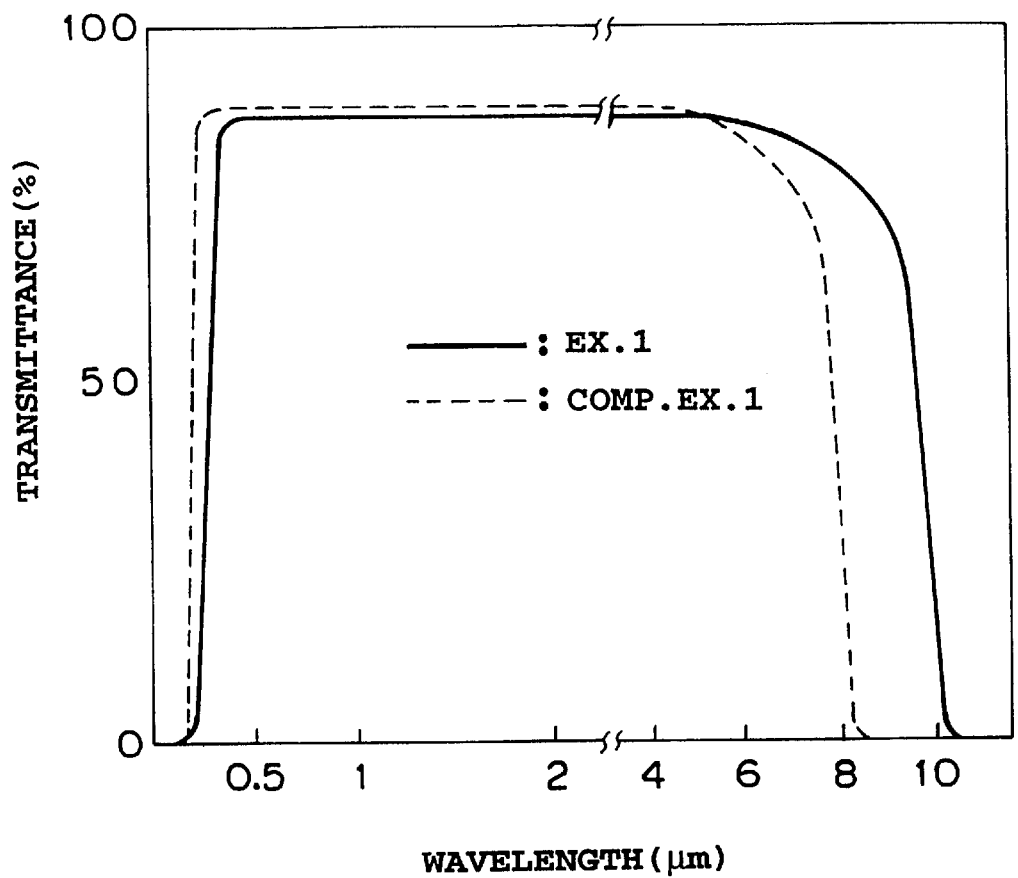
FIG. 4 is a characteristic chart showing the wavelength dependence of transmittance of glass material.

A 10 mm long cylindrical rod was cut out of the resulting glass rod, and its opposite end surfaces were polished, followed by measuring the transmission spectrum of the rod in the same manner as in Example 1. The results are indicated in FIG. 4 by a dashed line. As shown there, the absorption increased, starting at a wavelength of about 5 μm, and the transmission at a longer wavelength than 8 μm was small.

Some samples were measured for Raman spectrum in the same way as in Example 1. Peaks representing phonon energy appeared around 550 cm$^{-1}$, confirming the resulting glass to have greater phonon energy than the glass of Example 1.

crucible. Then, the temperature of the furnace was lowered to 700° C., and the crucible was withdrawn. The melt inside was poured into a brass mold with an outside diameter of 8 mm that had been preheated to 200° C., to quench the melt, obtaining a glass rod.

The resulting glass was measured for the glass transition temperature (Tg) and the crystallization temperature (Tx) using a differential scanning calorimeter. The results were Tg=258° C. and Tx=336° C. From these results, the value of (Tx–Tg) was 78° C., ascertaining that the resulting glass was thermally stable.

Preparation of Core Glass Samples Nos. 2 to 147

As in the preparation of core glass sample No. 1, InF$_3$, GaF$_3$, ZnF$_2$, CdF$_2$, PbF$_2$, YF$_3$, LaF$_3$, GdF$_3$ and LuF$_3$, all in anhydrous form, were weighed and mixed in the proportions shown in Tables 2 to 5. To each of the mixtures, 4 g of ammonium bifluoride was added, and placed in a crucible. The crucible was heated in a resistivity-heated furnace in the same manner as in Example 1 to melt the contents of the crucible. The melt inside the crucible was poured into a preheated mold for quenching, thereby obtaining a glass rod.

A 10 mm long cylindrical rod was cut out of each glass rod, and its opposite end surfaces were polished, followed by measuring the transmission spectrum of the rod. The rod was found to have good transmission at a wavelength of up to 10 μm. Some of the glass samples were measured for Raman spectrum. Peaks of all measurements were noted around 500 cm$^{-1}$, showing that the resulting glasses had small phonon energy.

TABLE 2

| No | InF3 | GaF3 | ZnF2 | PbF2 | CdF2 | YF3 | LaF3 | GdF3 | LuF3 | * | Tg | Tx | Tx − Tg |
|---|---|---|---|---|---|---|---|---|---|---|---|---|---|
| 2 | 17.0 | 17.0 | 19.0 | 43.0 | | 4.0 | | | | 1.6157 | 234.0 | 296.9 | 62.9 |
| 3 | 17.0 | 17.0 | 19.0 | 38.0 | 5.0 | 4.0 | | | | 1.6109 | 234.0 | 281.0 | 47.0 |
| 4 | 17.0 | 17.0 | 19.0 | 33.0 | 10.0 | | 4.0 | | | | | | 0.0 |
| 5 | 17.0 | 17.0 | 19.0 | 39.0 | | 8.0 | | | | | 235.4 | 304.0 | 68.6 |
| 6 | 17.0 | 17.0 | 19.0 | 35.0 | | 12.0 | | | | | 233.8 | 302.7 | 68.9 |
| 7 | 17.0 | 17.0 | 16.0 | 43.0 | 3.0 | 4.0 | | | | 1.6181 | 231.8 | 297.4 | 65.6 |
| 8 | 17.0 | 17.0 | 16.0 | 39.0 | 3.0 | 8.0 | | | | | 232.6 | 307.7 | 75.1 |
| 9 | 17.0 | 17.0 | 16.0 | 35.0 | 3.0 | | 12.0 | | | | 235.6 | 303.6 | 68.0 |
| 10 | 17.0 | 17.0 | 13.0 | 43.0 | 6.0 | 4.0 | | | | | 232.3 | 300.3 | 68.0 |
| 11 | 17.0 | 17.0 | 13.0 | 39.0 | 6.0 | 8.0 | | | | | 235.6 | 308.7 | 73.1 |
| 12 | 17.0 | 17.0 | 13.0 | 35.0 | 6.0 | 12.0 | | | | | 237.1 | 293.4 | 56.3 |
| 13 | 13.0 | 33.0 | 12.0 | 38.0 | | 4.0 | | | | 1.5983 | 256.8 | 332.1 | 75.3 |
| 14 | 17.0 | 17.0 | 16.0 | 39.0 | 3.0 | 8.0 | | | | 1.6031 | 242.2 | 340.1 | 97.9 |
| 15 | 15.0 | 15.0 | 16.0 | 39.0 | 3.0 | 12.0 | | | | | 248.0 | 299.1 | 51.1 |
| 16 | 17.0 | 17.0 | 9.0 | 39.0 | 10.0 | 8.0 | | | | | 243.3 | 318.7 | 75.4 |
| 17 | 17.0 | 17.0 | 9.0 | 35.0 | 10.0 | 12.0 | | | | | | | 0.0 |
| 18 | 17.0 | 33.0 | 8.0 | 38.0 | | | | 4.0 | | | | | 0.0 |
| 19 | 10.0 | 40.0 | 8.0 | 38.0 | | 4.0 | | | | | 271.9 | 344.7 | 72.8 |
| 20 | 17.0 | 17.0 | 12.0 | 39.0 | 3.0 | 12.0 | | | | 1.603 | 252.5 | 348.7 | 96.2 |
| 21 | 17.0 | 17.0 | 8.0 | 39.0 | 3.0 | 16.0 | | | | | | | 0.0 |
| 22 | 17.0 | 17.0 | 16.0 | 43.0 | 3.0 | 4.0 | | | | 1.6165 | 231.7 | 319.6 | 87.9 |
| 23 | 17.0 | 17.0 | 16.0 | 35.0 | 3.0 | 12.0 | | | | 1.598 | 254.1 | 355.4 | 101.3 |
| 24 | 6.0 | 40.0 | 12.0 | 38.0 | | 4.0 | | | | | | | 0.0 |
| 25 | 9.0 | 33.0 | 16.0 | 38.0 | | 4.0 | | | | | | | 0.0 |
| 26 | 17.0 | 33.0 | 12.0 | 34.0 | | 4.0 | | | | 1.5867 | 263.0 | 351.7 | 88.7 |
| 27 | 9.0 | 33.0 | 12.0 | 42.0 | | 4.0 | | | | | 254.9 | 332.4 | 77.5 |
| 28 | 16.0 | 26.0 | 16.0 | 38.0 | | 4.0 | | | | | 248.1 | 337.0 | 88.9 |
| 29 | 20.0 | 26.0 | 12.0 | 38.0 | | 4.0 | | | | | | | 0.0 |
| 30 | 9.0 | 33.0 | 12.0 | 42.0 | | 4.0 | | | | 1.6031 | 254.4 | 328.4 | 74.0 |
| 31 | 13.0 | 29.0 | 12.0 | 42.0 | | 4.0 | | | | 1.6042 | 249.8 | 330.6 | 80.8 |
| 32 | 13.0 | 37.0 | 12.0 | 34.0 | | 4.0 | | | | | 270.3 | 356.4 | 86.1 |
| 33 | 19.0 | 19.0 | 16.0 | 39.0 | 3.0 | 4.0 | | | | 1.5984 | 237.3 | 319.4 | 82.1 |
| 34 | 17.0 | 17.0 | 20.0 | 39.0 | 3.0 | 4.0 | | | | 1.6 | 237.7 | 291.7 | 54.0 |
| 35 | 21.0 | 29.0 | 12.0 | 34.0 | | 4.0 | | | | | 257.7 | 348.1 | 90.4 |
| 36 | 13.0 | 33.0 | 16.0 | 34.0 | | 4.0 | | | | 1.587 | 261.4 | 353.5 | 92.1 |
| 37 | 21.0 | 33.0 | 8.0 | 34.0 | | 4.0 | | | | | | | 0.0 |
| 38 | 9.0 | 29.0 | 16.0 | 42.0 | | 4.0 | | | | | 246.6 | 325.4 | 78.8 |
| 39 | 17.0 | 29.0 | 8.0 | 42.0 | | 4.0 | | | | 1.6116 | 246.4 | 327.0 | 80.6 |
| 40 | 13.0 | 33.0 | 8.0 | 42.0 | | 4.0 | | | | 1.5941 | 257.2 | 332.5 | 75.3 |
| 41 | 17.0 | 25.0 | 12.0 | 42.0 | | 4.0 | | | | 1.6034 | 245.4 | 324.4 | 79.0 |
| 42 | 15.0 | 15.0 | 20.0 | 43.0 | 3.0 | 4.0 | | | | | 231.5 | 299.1 | 67.6 |
| 43 | 13.0 | 13.0 | 20.0 | 43.0 | 3.0 | 8.0 | | | | | 237.3 | 286.6 | 49.3 |
| 44 | 15.0 | 15.0 | 16.0 | 43.0 | 3.0 | 8.0 | | | | | 236.3 | 301.0 | 64.7 |
| 45 | 17.0 | 17.0 | 12.0 | 43.0 | 3.0 | 8.0 | | | | | 237.8 | 327.9 | 90.1 |
| 46 | 13.0 | 13.0 | 16.0 | 43.0 | 3.0 | 12.0 | | | | | | | 0.0 |

* Refractive Index

TABLE 3

| No | InF3 | GaF3 | ZnF2 | PbF2 | CdF2 | YF3 | LaF3 | GdF3 | LuF3 | * | Tg | Tx | Tx − Tg |
|---|---|---|---|---|---|---|---|---|---|---|---|---|---|
| 47 | 15.0 | 15.0 | 12.0 | 43.0 | 3.0 | 12.0 | | | | | | | 0.0 |
| 48 | 13.0 | 37.0 | 4.0 | 42.0 | | 4.0 | | | | | | | 0.0 |
| 49 | 17.0 | 33.0 | 4.0 | 42.0 | | 4.0 | | | | | | | 0.0 |
| 50 | 21.0 | 29.0 | 4.0 | 42.0 | | 4.0 | | | | | | | 0.0 |
| 51 | 21.0 | 25.0 | 8.0 | 42.0 | | 4.0 | | | | | | | 0.0 |
| 52 | 9.0 | 37.0 | 8.0 | 42.0 | | 4.0 | | | | | | | 0.0 |
| 53 | 13.0 | 25.0 | 16.0 | 42.0 | | 4.0 | | | | | 240.5 | 308.4 | 67.9 |
| 54 | 13.0 | 29.0 | 8.0 | 46.0 | | 4.0 | | | | | | | 0.0 |
| 55 | 9.0 | 33.0 | 8.0 | 46.0 | | 4.0 | | | | | | | 0.0 |
| 56 | 19.0 | 19.0 | 12.0 | 43.0 | 3.0 | 4.0 | | | | 1.6066 | 234.3 | 313.8 | 79.5 |
| 57 | 13.0 | 25.0 | 12.0 | 46.0 | | 4.0 | | | | | | | 0.0 |
| 58 | 9.0 | 29.0 | 12.0 | 46.0 | | 4.0 | | | | | | | 0.0 |
| 59 | 21.0 | 21.0 | 8.0 | 43.0 | 3.0 | 4.0 | | | | | | | 0.0 |
| 60 | 13.0 | 29.0 | 12.0 | 42.0 | | 4.0 | | | | | | | 0.0 |
| 61 | 9.0 | 29.0 | 12.0 | 42.0 | | 4.0 | 4.0 | | | | | | 0.0 |
| 62 | 13.0 | 25.0 | 12.0 | 42.0 | | 4.0 | 4.0 | | | | 253.5 | 330.5 | 77.0 |
| 63 | 13.0 | 29.0 | 8.0 | 42.0 | | 4.0 | 4.0 | | | 1.6014 | 259.3 | 340.7 | 81.4 |
| 64 | 11.0 | 29.0 | 10.0 | 42.0 | | 8.0 | | | | | | | 0.0 |
| 65 | 11.0 | 29.0 | 10.0 | 42.0 | | 4.0 | 4.0 | | | | 258.1 | 337.1 | 79.0 |
| 66 | 13.0 | 29.0 | 12.0 | 39.0 | 3.0 | 4.0 | | | | 1.5742 | 251.6 | 327.1 | 75.5 |

TABLE 3-continued

| No | InF3 | GaF3 | ZnF2 | PbF2 | CdF2 | YF3 | LaF3 | GdF3 | LuF3 | * | Tg | Tx | Tx − Tg |
|---|---|---|---|---|---|---|---|---|---|---|---|---|---|
| 67 | 13.0 | 29.0 | 12.0 | 42.0 |  | 2.0 | 2.0 |  |  |  |  |  | 0.0 |
| 68 | 13.0 | 29.0 | 12.0 | 38.0 |  | 4.0 | 4.0 |  |  | 1.578 | 258.4 | 336.7 | 78.3 |
| 69 | 17.0 | 17.0 | 16.0 | 42.0 |  | 8.0 |  |  |  |  |  |  | 0.0 |
| 70 | 17.0 | 17.0 | 16.0 | 36.0 | 6.0 | 8.0 |  |  |  |  |  |  | 0.0 |
| 71 | 17.0 | 17.0 | 16.0 | 33.0 | 9.0 | 8.0 |  |  |  |  |  |  | 0.0 |
| 72 | 17.0 | 17.0 | 16.0 | 30.0 | 12.0 | 8.0 |  |  |  |  |  |  | 0.0 |
| 73 | 13.0 | 29.0 | 12.0 | 36.0 | 6.0 |  | 4.0 |  |  | 1.597 | 248.7 | 321.1 | 72.4 |
| 74 | 13.0 | 29.0 | 12.0 | 33.0 | 9.0 |  | 4.0 |  |  | 1.5779 | 252.5 | 303.8 | 51.3 |
| 75 | 13.0 | 29.0 | 12.0 | 30.0 | 12.0 |  | 4.0 |  |  |  |  |  | 0.0 |
| 76 | 21.0 | 13.0 | 16.0 | 39.0 | 3.0 | 8.0 |  |  |  |  | 238.8 | 324.2 | 85.4 |
| 77 | 13.0 | 21.0 | 16.0 | 39.0 | 3.0 | 8.0 |  |  |  | 1.5821 | 247.8 | 340.2 | 92.4 |
| 78 | 13.0 | 29.0 | 16.0 | 38.0 |  |  | 4.0 |  |  |  | 249.5 | 315.8 | 66.3 |
| 79 | 13.0 | 29.0 | 12.0 | 38.0 |  | 8.0 |  |  |  |  |  |  | 0.0 |
| 80 | 13.0 | 29.0 | 8.0 | 42.0 |  | 8.0 |  |  |  |  |  |  | 0.0 |
| 81 | 13.0 | 29.0 | 8.0 | 46.0 |  | 4.0 |  |  |  |  |  |  | 0.0 |
| 82 | 13.0 | 29.0 | 16.0 | 34.0 |  | 4.0 | 4.0 |  |  | 1.5914 | 271.6 | 353.1 | 81.5 |
| 83 | 13.0 | 29.0 | 12.0 | 34.0 |  | 8.0 | 4.0 |  |  |  | 272.8 | 363.2 | 90.4 |
| 84 | 13.0 | 29.0 | 8.0 | 38.0 |  | 8.0 | 4.0 |  |  |  | 267.7 | 353.7 | 86.0 |
| 85 | 13.0 | 29.0 | 4.0 | 42.0 |  | 8.0 | 4.0 |  |  |  | 267.7 | 342.0 | 74.3 |
| 86 | 13.0 | 29.0 | 8.0 | 39.0 | 3.0 | 4.0 | 4.0 |  |  |  |  |  | 0.0 |
| 87 | 13.0 | 29.0 | 5.0 | 42.0 | 3.0 | 4.0 | 4.0 |  |  |  |  |  | 0.0 |
| 88 | 13.0 | 29.0 | 20.0 | 30.0 |  | 4.0 |  | 4.0 |  |  |  |  | 0.0 |
| 89 | 13.0 | 29.0 | 4.0 | 46.0 |  | 4.0 |  |  | 4.0 |  |  |  | 0.0 |
| 90 | 13.0 | 25.0 | 8.0 | 42.0 |  | 8.0 | 4.0 |  |  |  | 258.8 | 317.3 | 58.5 |
| 91 | 13.0 | 21.0 | 12.0 | 42.0 |  | 8.0 | 4.0 |  |  |  |  |  | 0.0 |

* Refractive Index

TABLE 4

| No | InF3 | GaF3 | ZnF2 | PbF2 | CdF2 | YF3 | LaF3 | GdF3 | LuF3 | * | Tg | Tx | Tx − Tg |
|---|---|---|---|---|---|---|---|---|---|---|---|---|---|
| 92 | 13.0 | 17.0 | 16.0 | 42.0 |  | 8.0 | 4.0 |  |  |  |  |  | 0.0 |
| 93 | 13.0 | 21.0 | 16.0 | 42.0 |  | 4.0 | 4.0 |  |  |  | 248.4 | 319.4 | 71.0 |
| 94 | 21.0 | 21.0 | 8.0 | 39.0 | 3.0 | 8.0 |  |  |  |  |  |  | 0.0 |
| 95 | 17.0 | 25.0 | 8.0 | 39.0 | 3.0 | 8.0 |  |  |  | 1.602 | 255.6 | 349.7 | 94.1 |
| 96 | 17.0 | 21.0 | 12.0 | 39.0 | 3.0 | 8.0 |  |  |  | 1.604 | 249.5 | 343.9 | 94.4 |
| 97 | 21.0 | 17.0 | 12.0 | 39.0 | 3.0 | 8.0 |  |  |  |  | 245.8 | 339.3 | 93.5 |
| 98 | 17.0 | 13.0 | 20.0 | 39.0 | 3.0 | 8.0 |  |  |  |  | 237.5 | 303.6 | 66.1 |
| 99 | 17.0 | 13.0 | 16.0 | 39.0 | 3.0 | 12.0 |  |  |  |  |  |  | 0.0 |
| 100 | 17.0 | 21.0 | 16.0 | 39.0 | 3.0 | 4.0 |  |  |  |  | 240.9 | 329.6 | 88.7 |
| 101 | 17.0 | 21.0 | 8.0 | 39.0 | 3.0 | 12.0 |  |  |  | 1.6071 | 258.6 | 357.1 | 98.5 |
| 102 | 17.0 | 25.0 | 12.0 | 39.0 | 3.0 | 4.0 |  |  |  |  | 244.3 | 331.9 | 87.6 |
| 103 | 17.0 | 25.0 | 4.0 | 39.0 | 3.0 | 12.0 |  |  |  |  |  |  | 0.0 |
| 104 | 13.0 | 33.0 | 4.0 | 42.0 |  | 4.0 | 4.0 |  |  |  | 264.1 | 328.3 | 64.2 |
| 105 | 13.0 | 25.0 | 4.0 | 42.0 |  | 12.0 | 4.0 |  |  |  | 270.8 | 318.8 | 48.0 |
| 106 | 15.5 | 21.0 | 20.0 | 39.0 | 3.0 | 1.5 |  |  |  |  | 235.8 | 315.8 | 80.0 |
| 107 | 15.5 | 25.0 | 16.0 | 39.0 | 3.0 |  | 1.5 |  |  |  | 234.1 | 284.9 | 50.8 |
| 108 | 5.0 | 25.0 | 25.0 | 30.0 | 13.5 | 1.5 |  |  |  |  |  |  | 0.0 |
| 109 | 17.0 | 23.0 | 10.0 | 39.0 | 3.0 | 8.0 |  |  |  | 1.597 | 252.0 | 355.6 | 103.6 |
| 110 | 19.0 | 19.0 | 16.0 | 35.0 | 3.0 | 8.0 |  |  |  |  |  |  | 0.0 |
| 111 | 17.0 | 17.0 | 20.0 | 35.0 | 3.0 | 8.0 |  |  |  |  |  |  | 0.0 |
| 112 | 19.0 | 19.0 | 12.0 | 35.0 | 3.0 | 12.0 |  |  |  |  |  |  | 0.0 |
| 113 | 25.0 | 13.0 | 12.0 | 35.0 | 3.0 | 12.0 |  |  |  |  |  |  | 0.0 |
| 114 | 21.0 | 21.0 | 16.0 | 35.0 | 3.0 | 4.0 |  |  |  |  |  |  | 0.0 |
| 115 | 19.0 | 19.0 | 20.0 | 35.0 | 3.0 | 4.0 |  |  |  |  |  |  | 0.0 |
| 116 | 17.0 | 13.0 | 4.0 | 34.0 | 20.0 |  | 12.0 |  |  |  |  |  | 0.0 |
| 117 | 17.0 | 17.0 | 4.0 | 30.0 | 20.0 | 12.0 |  |  |  |  |  |  | 0.0 |
| 118 | 15.0 | 15.0 | 24.0 | 39.0 | 3.0 | 4.0 |  |  |  |  | 232.5 | 276.7 | 44.2 |
| 119 | 15.0 | 15.0 | 20.0 | 39.0 | 3.0 | 8.0 |  |  |  |  | 237.6 | 301.7 | 64.1 |
| 120 | 19.0 | 19.0 | 12.0 | 39.0 | 3.0 | 8.0 |  |  |  |  |  |  | 0.0 |
| 121 | 17.0 | 17.0 | 8.0 | 39.0 | 7.0 | 12.0 |  |  |  | 1.586 | 244.4 | 347.4 | 103.0 |
| 122 | 17.0 | 17.0 | 12.0 | 43.0 | 3.0 | 8.0 |  |  |  |  |  |  | 0.0 |
| 123 | 15.0 | 15.0 | 20.0 | 35.0 | 3.0 | 12.0 |  |  |  |  |  |  | 0.0 |
| 124 | 15.0 | 15.0 | 16.0 | 35.0 | 7.0 | 12.0 |  |  |  |  |  |  | 0.0 |
| 125 | 21.0 | 21.0 | 8.0 | 39.0 | 3.0 | 8.0 |  |  |  |  |  |  | 0.0 |
| 126 | 13.0 | 33.0 | 8.0 | 38.0 |  | 4.0 | 4.0 |  |  |  | 266.5 | 347.6 | 81.0 |
| 127 | 13.0 | 29.0 | 8.0 | 42.0 |  | 4.0 | 4.0 |  |  |  |  |  | 0.0 |
| 128 | 13.0 | 33.0 | 12.0 | 34.0 |  | 4.0 | 4.0 |  |  | 1.563 | 269.1 | 360.9 | 91.8 |
| 129 | 13.0 | 25.0 | 12.0 | 42.0 |  | 4.0 | 4.0 |  |  | 1.6077 | 254.3 | 335.7 | 81.4 |
| 130 | 13.0 | 29.0 | 16.0 | 34.0 |  | 4.0 | 4.0 |  |  | 1.5797 | 264.3 | 359.8 | 95.5 |
| 131 | 13.0 | 25.0 | 16.0 | 38.0 |  | 4.0 | 4.0 |  |  | 1.5965 | 251.6 | 349.9 | 98.3 |
| 132 | 13.0 | 37.0 | 12.0 | 30.0 |  | 4.0 | 4.0 |  |  |  |  |  | 0.0 |
| 133 | 13.0 | 37.0 | 8.0 | 34.0 |  | 4.0 | 4.0 |  |  |  | 276.8 | 356.5 | 79.7 |
| 134 | 13.0 | 29.0 | 20.0 | 30.0 |  | 4.0 | 4.0 |  |  |  | 263.4 | 349.9 | 86.5 |

TABLE 4-continued

| No | InF3 | GaF3 | ZnF2 | PbF2 | CdF2 | YF3 | LaF3 | GdF3 | LuF3 | * | Tg | Tx | Tx - Tg |
|---|---|---|---|---|---|---|---|---|---|---|---|---|---|
| 135 | 13.0 | 33.0 | 16.0 | 30.0 | | 4.0 | 4.0 | | | 1.568 | 270.9 | 373.3 | 102.4 |
| 136 | 13.0 | 21.0 | 20.0 | 38.0 | | 4.0 | 4.0 | | | 1.6032 | 249.1 | 328.5 | 79.4 |

* Refractive Index

TABLE 5

| No | InF3 | GaF3 | ZnF2 | PbF2 | CdF2 | YF3 | LaF3 | GdF3 | LuF3 | * | Tg | Tx | Tx - Tg |
|---|---|---|---|---|---|---|---|---|---|---|---|---|---|
| 137 | 13.0 | 37.0 | 4.0 | 38.0 | | 4.0 | 4.0 | | | 1.5895 | 273.8 | 350.1 | 76.3 |
| 138 | 13.0 | 29.0 | 9.0 | 38.0 | 3.0 | 4.0 | 4.0 | | | | 251.3 | 333.4 | 82.1 |
| 139 | 13.0 | 29.0 | 12.0 | 35.0 | 3.0 | 4.0 | 4.0 | | | 1.5778 | 244.9 | 357.6 | 112.7 |
| 140 | 13.0 | 29.0 | 6.0 | 38.0 | 6.0 | 4.0 | 4.0 | | | | 240.0 | 322.1 | 82.1 |
| 141 | 13.0 | 29.0 | 12.0 | 32.0 | 6.0 | 4.0 | 4.0 | | | | 248.7 | 346.9 | 98.2 |
| 142 | 13.0 | 29.0 | 12.0 | 29.0 | 9.0 | 4.0 | 4.0 | | | | | | |
| 143 | 13.0 | 29.0 | 3.0 | 38.0 | 9.0 | 4.0 | 4.0 | | | | | | |
| 144 | 13.0 | 25.0 | 12.0 | 38.0 | 4.0 | 4.0 | 4.0 | | | | | | |
| 145 | 13.0 | 25.0 | 12.0 | 35.0 | 7.0 | 4.0 | 4.0 | | | | | | |
| 146 | 13.0 | 25.0 | 8.0 | 42.0 | 4.0 | 4.0 | 4.0 | | | | | | |
| 147 | 13.0 | 25.0 | 4.0 | 42.0 | 8.0 | 4.0 | 4.0 | | | | | | |

* Refractive Index

Preparation of Optical Fiber

Core glass sample No. 1 was used as core glass, and fluoride glass with the composition 28 $InF_3$-9 $GaF_3$-17 $ZnF_2$-18 $BaF_2$-6 $SrF_2$-5 $YF_3$-10 NaF-7 LiF (mol %) was used as cladding glass to prepare a fluoride fiber perform by the suction casting method.

First, $InF_3$, $GaF_3$, $ZnF_2$, $PbF_2$, $YF_3$, $LaF_3$, $BaF_2$, $SrF_2$, NaF and LiF, all in anhydrous form, were weighed and mixed to have the compositions of the above core and cladding. Each of the mixtures was placed in a crucible, which was heated under an argon atmosphere in a resistivity-heated furnace to melt the contents of the crucible.

Figure 5B:
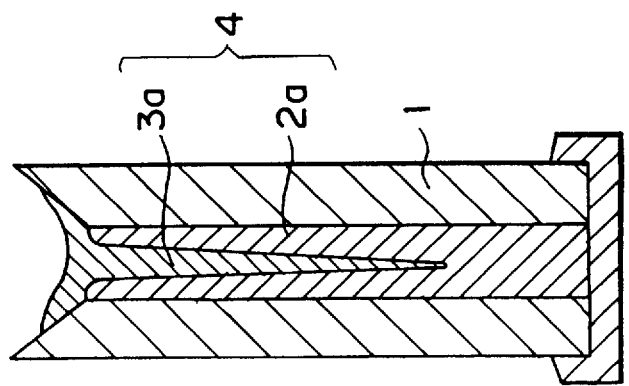
FIGS. 5A and 5B are schematic sectional views showing the steps in the production of a fiber perform by the suction casting method.
Figure 5A:
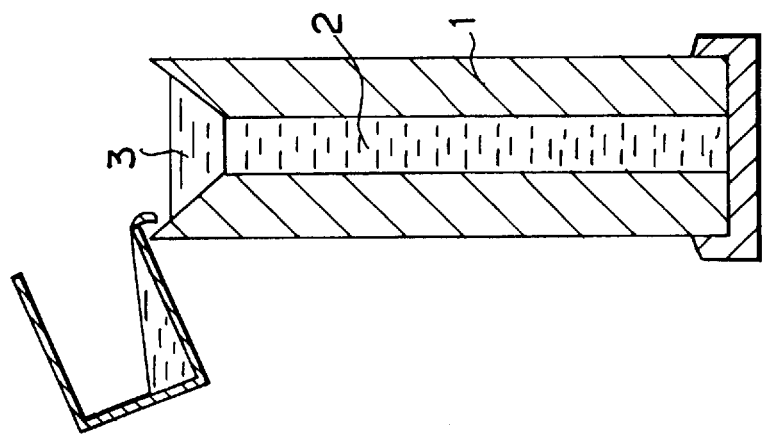

Then, a fiber perform was prepared by the suction casting method illustrated in FIG. 5. That is, the temperature of the glass melt formed by heating for 1 hour at 900° C. in the resistivity-heated furnace was lowered to 700° C. Then, the cladding glass melt 2 was poured into a brass mold 1, preheated to 220° C., up to its upper portion. Then, the core glass melt 3 was poured onto the cladding glass melt 2 when the cladding glass melt 2 began solidifying and its upper center began depressing, as shown in FIG. 5A. Significant volume contraction occurred during cooling and solidification. This volume contraction of the cladding glass 2a resulted in the suction of the core glass 3a into the depressed center of the cladding glass 2a. The sucked-in core glass 3a solidified in the center of the cylindrical cladding glass 2a to form a fiber perform 4, as shown in FIG. 5B. The resulting fiber perform 4 had a cladding outer diameter of 5 mm, a core outer diameter of 0.2 to 1.7 mm varying in a tapered manner, and a length of 30 mm.

Then, a jacketing tube having the same composition as the cladding glass was prepared by the rotational casting method illustrated in FIG. 6. That is, the raw materials weighed and mixed to have the composition of the cladding glass were put in a crucible, which was heated in a resistivity-heated furnace to melt the contents of the crucible. The resulting jacketing tube melt 12 was poured into a preheated brass mold 11 as shown in FIG. 6A. The mold 11 was laid horizontally and rotated at a high speed as shown in FIG. 6B. While rotated in this condition, the melt 12 was cooled and solidified to obtain a fluoride glass jacketing tube 13 with an outside diameter of 15 mm, an inside diameter of 5 mm, and a length of 140 mm.

Figure 7C:
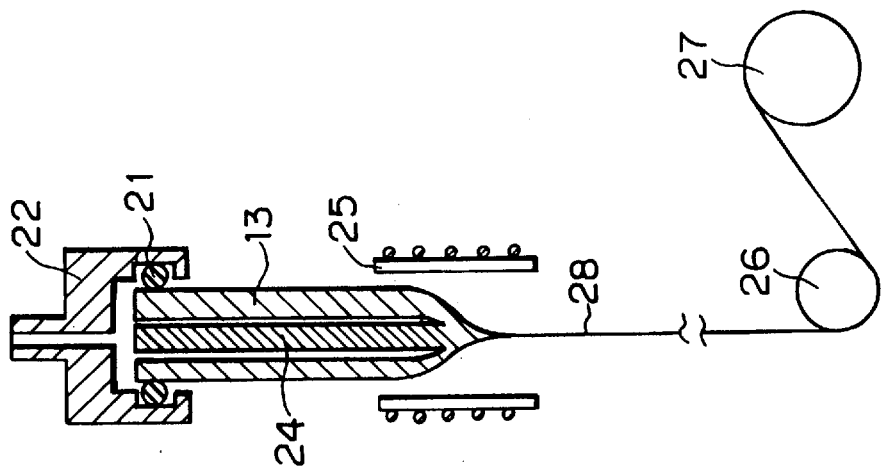
FIGS. 7A to 7C are schematic sectional views showing the steps in the production of an optical fiber according to the invention.
Figure 7B:
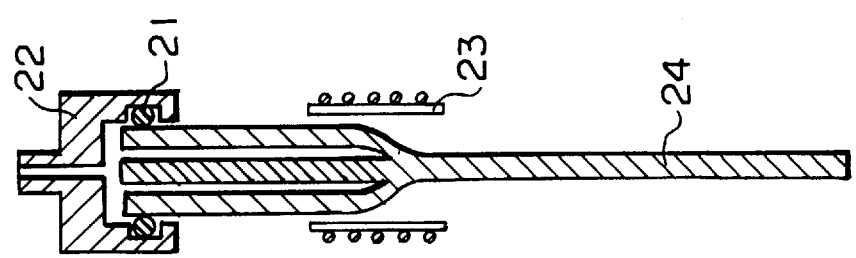
Figure 7A:
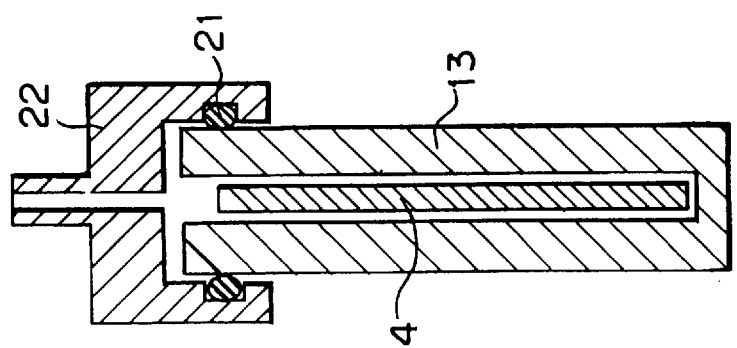

Then, the glass fiber perform 4 was inserted into the jacketing tube 13 inside a glove box supplied with nitrogen gas with a dew point of −60° C. or lower. As shown in FIG. 7A, the jacketing tube 13 was held by a perform holder 22 via an O-ring 21. Then, with the inside being evacuated, the perform 4 along with the jacketing tube 13 was fed to a heating furnace 23 at a rate of 3 mm/min as shown in FIG. 7B. A lower part of the composite heated to the softening temperature was pulled downward to obtain a glass fiber perform 24 having an outside diameter of 5 mm.

Then, a portion having a core diameter of 0.2 mm was cut out of the perform 24, and housed in a heating vacuum chamber together with a jacketing tube 13' prepared in the same manner as described above. Surface treatment was performed in an $F_2$-HF mixed gas atmosphere. Inside a glove box (not shown) supplied with nitrogen gas at a dew point of −60° C. or lower, the perform 24 was inserted into the jacketing tube 13', and the jacketing tube 13' was held by a perform holder 22 via an O-ring 21. Then, with the inside being evacuated, the perform 24 along with the jacketing tube 13' was fed to a fiber drawing furnace 25 at a rate of 3 mm/min, as shown in FIG. 7C. The composite was heated to the softening temperature, and its lower part was pulled downward by a capstan driver 27 via a tensionmeter 26, whereby the composite was drawn into a fiber having an outside diameter of 125 μm.

The resulting optical fiber was a single mode fiber having Δn=8% and a core diameter of 1 μm, and its transmission loss at a wavelength of 1.3 μm was as low as 0.2 dB/m.

Fibers with low transmission losses were producible by the same method as described above, with the composition of the jacketing tube 13 and 13' being 47.5 $HfF_4$-23.5 $BaF_2$-2.5 $LaF_3$-2 $YF_3$-4.5 $AlF_3$-20 NaF, or 47.5 $ZrF_4$-23.5 $BaF_2$-2.5 $LaF_3$-2 $YF_3$-4.5 $AlF_3$-20 NaF, or with the composition of the jacketing tube 13 being 47.5 $HfF_4$-23.5 $BaF_2$-2.5 $LaF_3$-2 $YF_3$-4.5 $AlF_3$-20 NaF and that of the jacketing tube 13' being 47.5 $ZrF_4$-23.5 $BaF_2$-2.5 $LaF_3$-2 $YF_3$-4.5 $AlF_3$-20 NaF.

Optical fibers were prepared in the same manner as described above, except that the core glass-cladding glass combination was changed as in Table 6. The resulting optical fibers were single mode fibers having Δn=3 to 8%, and their transmission loss at a wavelength of 1.3 μm was as low as 0.2 dB/m.

The resulting optical fiber was a single mode fiber having a length of 100 m, a core diameter of 1.7 μm, and a cut-off wavelength of 0.95 μm, but its transmission loss at a wavelength of 1.3 μm was as high as 10 dB/m.

TABLE 6

| | Composition of Glass for Core | | | | | | | | Compostion of Glass for Cladding | | | | | | | | | | | Δ |
|---|---|---|---|---|---|---|---|---|---|---|---|---|---|---|---|---|---|---|---|---|
| No | InF3 | GaF3 | ZnF2 | PbF2 | CdF2 | YF3 | LaF3 | * | InF3 | GaF3 | ZnF2 | PbF2 | BaF2 | SrF2 | YF3 | LaF | NaF | LiF | * | n |
| 1 | 13.0 | 29.0 | 16.0 | 34.0 | | 4.0 | 4.0 | 1.5914 | 25.0 | 15.0 | 16.0 | 10.0 | 14.0 | 10.0 | 5.0 | | | 5.0 | 1.5136 | 4.9 |
| 2 | 13.0 | 29.0 | 12.0 | 38.0 | | 4.0 | 4.0 | 1.578 | 30.0 | 10.0 | 16.0 | 10.0 | 14.0 | 10.0 | 5.0 | | | 5.0 | 1.5195 | 3.7 |
| 3 | 13.0 | 29.0 | 12.0 | 35.0 | 3.0 | 4.0 | 4.0 | 1.5778 | 25.0 | 15.0 | 16.0 | | 18.0 | 6.0 | 5.0 | | 10.0 | 5.0 | 1.4705 | 6.8 |
| 4 | 13.0 | 29.0 | 16.0 | 34.0 | | 4.0 | 4.0 | 1.5797 | 25.0 | 19.0 | 12.0 | 10.0 | 14.0 | 10.0 | 5.0 | | | 5.0 | 1.506 | 4.7 |
| 5 | 13.0 | 29.0 | 12.0 | 35.0 | 3.0 | 4.0 | 4.0 | 1.5778 | 26.0 | 11.0 | 15.0 | 12.0 | 16.0 | 10.0 | 5.0 | | | 5.0 | 1.5175 | 3.8 |
| 6 | 13.0 | 29.0 | 12.0 | 35.0 | 3.0 | 4.0 | 4.0 | 1.5778 | 26.0 | 11.0 | 13.0 | 12.0 | 18.0 | 10.0 | 5.0 | | | 5.0 | 1.5182 | 3.8 |
| 7 | 17.0 | 17.0 | 16.0 | 35.0 | 3.0 | 12.0 | | 1.598 | 26.0 | 11.0 | 17.0 | 14.0 | 12.0 | 10.0 | 5.0 | | | 5.0 | 1.5237 | 4.6 |
| 8 | 13.0 | 33.0 | 12.0 | 34.0 | | 4.0 | 4.0 | 1.563 | 26.0 | 11.0 | 17.0 | 16.0 | 10.0 | 10.0 | 5.0 | | | 5.0 | 1.5306 | 2.1 |
| 9 | 17.0 | 23.0 | 10.0 | 39.0 | 3.0 | 8.0 | | 1.597 | 26.0 | 11.0 | 17.0 | | 18.0 | 6.0 | 5.0 | | 12.0 | 5.0 | 1.469 | 8.0 |
| 10 | 13.0 | 29.0 | 12.0 | 35.0 | 3.0 | 4.0 | 4.0 | 1.5778 | 26.0 | 11.0 | 17.0 | | 16.0 | 6.0 | 5.0 | | 14.0 | 5.0 | 1.4635 | 7.2 |
| 11 | 13.0 | 25.0 | 16.0 | 38.0 | | 4.0 | 4.0 | 1.5965 | 24.0 | 13.0 | 17.0 | 14.0 | 12.0 | 10.0 | 5.0 | | | 5.0 | 1.5255 | 4.4 |
| 12 | 13.0 | 33.0 | 16.0 | 30.0 | | 4.0 | 4.0 | 1.568 | 28.0 | 9.0 | 17.0 | 14.0 | 12.0 | 10.0 | 5.0 | | | 5.0 | 1.5294 | 2.5 |
| 13 | 13.0 | 33.0 | 16.0 | 34.0 | | | 4.0 | 1.587 | 25.5 | 10.5 | 16.5 | 14.5 | 12.5 | 10.5 | 4.5 | | | 5.5 | 1.5265 | 3.8 |
| 14 | 13.0 | 29.0 | 12.0 | 35.0 | 3.0 | 4.0 | 4.0 | 1.5778 | 27.5 | 8.5 | 16.5 | 14.5 | 12.5 | 10.5 | 4.5 | | | 5.5 | 1.5302 | 3.0 |
| 15 | 17.0 | 17.0 | 8.0 | 39.0 | 7.0 | 12.0 | | 1.586 | 28.0 | 9.0 | 17.0 | 12.0 | 14.0 | 10.0 | 5.0 | | | 5.0 | 1.5211 | 4.1 |
| 16 | 13.0 | 25.0 | 12.0 | 42.0 | | 4.0 | 4.0 | 1.6077 | 28.0 | 9.0 | 17.0 | 10.0 | 16.0 | 10.0 | 5.0 | | | 5.0 | 1.5165 | 5.7 |
| 17 | 17.0 | 21.0 | 8.0 | 39.0 | 3.0 | 12.0 | | 1.6071 | 28.0 | 9.0 | 17.0 | 14.0 | 12.0 | 10.0 | 5.0 | | | 5.0 | 1.5275 | 5.0 |
| 18 | 17.0 | 25.0 | 8.0 | 39.0 | 3.0 | 8.0 | | 1.602 | 28.0 | 9.0 | 17.0 | 12.0 | 16.0 | 8.0 | 5.0 | | | 5.0 | 1.5225 | 5.0 |
| 19 | 17.0 | 21.0 | 12.0 | 39.0 | 3.0 | 8.0 | | 1.604 | 28.0 | 9.0 | 17.0 | 14.0 | 12.0 | 10.0 | 2.5 | 2.5 | | 5.0 | 1.5305 | 4.6 |
| 20 | 13.0 | 21.0 | 16.0 | 39.0 | 3.0 | 8.0 | | 1.5821 | 25.5 | 11.5 | 17.0 | 14.0 | 12.0 | 10.0 | 2.5 | 2.5 | | 5.0 | 1.5282 | 3.4 |
| 21 | 13.0 | 29.0 | 12.0 | 35.0 | 3.0 | 4.0 | 4.0 | 1.5778 | 25.0 | 15.0 | 16.0 | 10.0 | 14.0 | 10.0 | 5.0 | | | 5.0 | 1.514 | 4.1 |
| 22 | 13.0 | 33.0 | 12.0 | 34.0 | | 4.0 | 4.0 | 1.563 | 26.0 | 11.0 | 17.0 | 20.0 | 10.0 | 6.0 | 5.0 | | | 5.0 | 1.548 | 1.0 |

* Refractive Index

COMPARATIVE EXAMPLE 2

A comparative optical fiber was prepared in the same manner as in Example 2 using as the core glass fluoride glass with the composition 16 InF$_3$-19 GaF$_3$ -15 ZnF$_2$-22 CdF$_2$-28 PbF$_2$ (mol %), and as the cladding glass fluoride glass with the composition 28 InF$_3$-9 GaF$_3$-12 ZnF$_2$-18 BaF$_2$-6 SrF$_2$-5 YF$_3$-10 NaF-7 LiF-5 CdF$_2$ (mol %).

The fluoride glass used here as the core glass was different from the fluoride glass used in Example 2 in that the CdF$_2$ concentration was more than 20 mol %, the PbF$_2$ concentration was less than 30 mol %, and at least one member selected from the group consisting of LaF$_3$, YF$_3$, GdF$_3$ and LuF$_3$ was not contained. The fluoride glass used here as the cladding glass was different from the fluoride glass used as the cladding glass in Example 2 in that 5 mol % of CdF$_2$ was contained.

EXAMPLE 3

Figure 8:
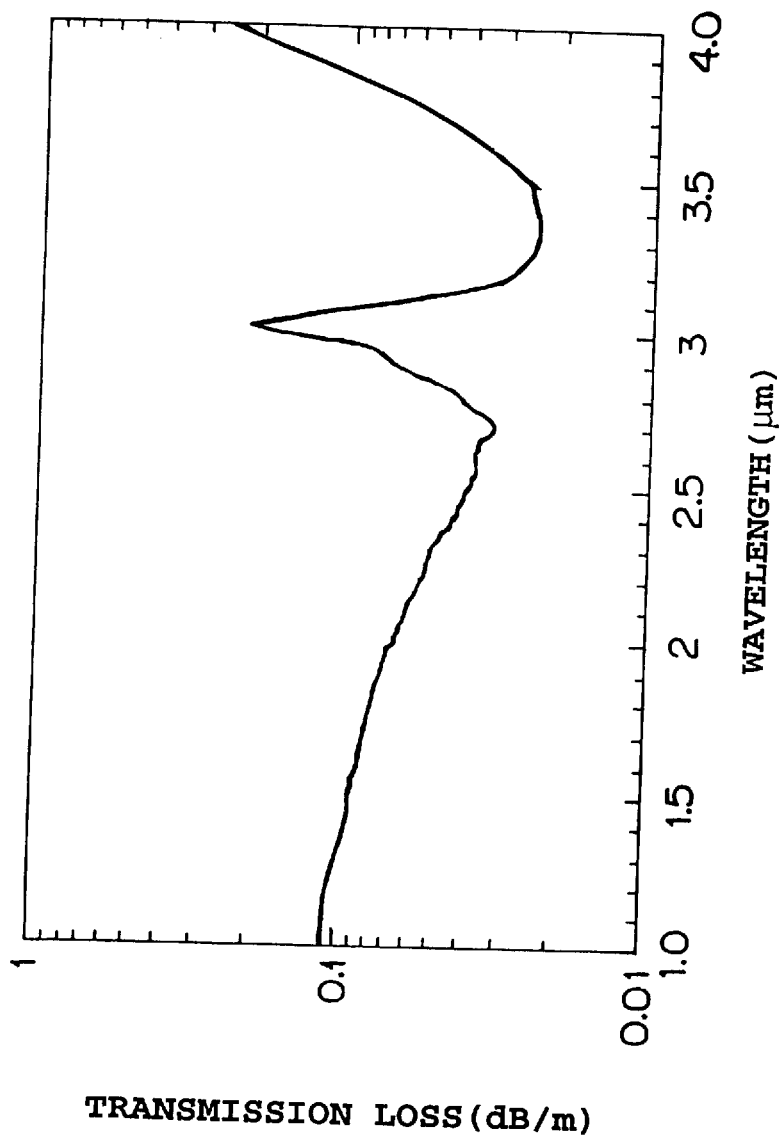
FIG. 8 is a characteristic chart showing the wavelength dependence of transmission loss in an embodiment of the optical fiber of the invention.

Optical fibers were prepared in the same manner as in Example 2, except that the combination of the core glass composition and the cladding glass composition was changed as in Table 7. The resulting optical fibers were all single mode fibers having Δn=1 to 4%, and their transmission loss at wavelength 1.3 μm was as low as 0.1 dB/m. FIG. 8 shows the transmission loss spectrum of the optical fibers at 1 to 4 μm. The transmission loss decreased as the wavelength became longer, and a minimum loss of 0.025 dB/m was obtained at wavelength 3.3 μm.

TABLE 7

| | Composition of Glass for Core | | | | | | | | | | | |
|---|---|---|---|---|---|---|---|---|---|---|---|---|
| No | InF3 | GaF3 | ZnF2 | PbF2 | BaF2 | SrF2 | LaF3 | YF3 | GdF3 | LuF3 | NaF | LiF |
| 1 | 28.0 | 9.0 | 17.0 | 12.0 | 16.0 | 8.0 | 2.5 | 2.5 | | | | 5.0 |
| 2 | 28.0 | 9.0 | 17.0 | 10.0 | 16.0 | 8.0 | 2.5 | 2.5 | | | 2.0 | 5.0 |
| 3 | 28.0 | 9.0 | 17.0 | 8.0 | 16.0 | 8.0 | 2.5 | 2.5 | | | 4.0 | 5.0 |
| 4 | 28.0 | 9.0 | 17.0 | 6.0 | 16.0 | 8.0 | 2.5 | 2.5 | | | 6.0 | 5.0 |
| 5 | 28.0 | 9.0 | 17.0 | 4.0 | 16.0 | 8.0 | 2.5 | 2.5 | | | 8.0 | 5.0 |
| 6 | 25.5 | 11.5 | 15.0 | 12.0 | 18.0 | 8.0 | 2.5 | 2.5 | | | | 5.0 |
| 7 | 25.5 | 11.5 | 15.0 | 10.0 | 18.0 | 8.0 | 2.5 | 2.5 | | | 2.0 | 5.0 |
| 8 | 25.5 | 11.5 | 15.0 | 8.0 | 18.0 | 8.0 | 2.5 | 2.5 | | | 4.0 | 5.0 |
| 9 | 25.5 | 11.5 | 15.0 | 6.0 | 18.0 | 8.0 | 2.5 | 2.5 | | | 6.0 | 5.0 |
| 10 | 25.5 | 11.5 | 15.0 | 4.0 | 18.0 | 8.0 | 2.5 | 2.5 | | | 8.0 | 5.0 |
| 11 | 25.5 | 11.5 | 15.0 | 12.0 | 18.0 | 8.0 | 2.5 | 2.5 | | | | 5.0 |
| 12 | 25.5 | 11.5 | 15.0 | 12.0 | 18.0 | 8.0 | 2.5 | 2.5 | | | | 5.0 |

TABLE 7-continued

| | | | | | | | | | | | |
|---|---|---|---|---|---|---|---|---|---|---|---|
| 13 | 25.5 | 11.5 | 15.0 | 12.0 | 18.0 | 8.0 | 2.5 | 2.5 | | | 5.0 |
| 14 | 25.5 | 11.5 | 15.0 | 12.0 | 18.0 | 8.0 | | 2.5 | 2.5 | | 5.0 |
| 15 | 25.5 | 11.5 | 15.0 | 12.0 | 18.0 | 8.0 | | 2.5 | | 2.5 | 5.0 |

| | Composition of Glass for Cladding | | | | | | | | | | | | Δ |
|---|---|---|---|---|---|---|---|---|---|---|---|---|---|
| No | InF3 | GaF3 | ZnF2 | PbF2 | BaF2 | SrF2 | LaF3 | YF3 | GdF3 | LuF3 | NaF | LiF | n |
| 1 | 25.5 | 11.5 | 14.0 | | 19.0 | 8.0 | 2.5 | 2.5 | | | 12.0 | 5.0 | 4.0 |
| 2 | 25.5 | 11.5 | 14.0 | | 19.0 | 8.0 | 2.5 | 2.5 | | | 12.0 | 5.0 | 3.5 |
| 3 | 25.5 | 11.5 | 14.0 | | 19.0 | 8.0 | 2.5 | 2.5 | | | 12.0 | 5.0 | 3.0 |
| 4 | 25.5 | 11.5 | 14.0 | | 19.0 | 8.0 | 2.5 | 2.5 | | | 12.0 | 5.0 | 2.5 |
| 5 | 25.5 | 11.5 | 14.0 | | 19.0 | 8.0 | 2.5 | 2.5 | | | 12.0 | 5.0 | 2.0 |
| 6 | 25.5 | 11.5 | 14.0 | | 19.0 | 8.0 | 2.5 | 2.5 | | | 10.0 | 7.0 | 3.7 |
| 7 | 25.5 | 11.5 | 14.0 | | 19.0 | 8.0 | 2.5 | 2.5 | | | 10.0 | 7.0 | 3.0 |
| 8 | 25.5 | 11.5 | 14.0 | | 19.0 | 8.0 | 2.5 | 2.5 | | | 10.0 | 7.0 | 2.5 |
| 9 | 25.5 | 11.5 | 14.0 | | 19.0 | 8.0 | 2.5 | 2.5 | | | 10.0 | 7.0 | 2.0 |
| 10 | 25.5 | 11.5 | 14.0 | | 19.0 | 8.0 | 2.5 | 2.5 | | | 10.0 | 7.0 | 1.5 |
| 11 | 25.5 | 11.5 | 14.0 | | 19.0 | 8.0 | 2.5 | 2.5 | | | 12.0 | 5.0 | 4.0 |
| 12 | 25.5 | 11.5 | 14.0 | 2.5 | 19.0 | 8.0 | 2.5 | 2.5 | | | 7.5 | 7.0 | 2.5 |
| 13 | 25.5 | 11.5 | 14.0 | 5.0 | 19.0 | 8.0 | 2.5 | 2.5 | | | 5.0 | 7.0 | 1.0 |
| 14 | 25.5 | 11.5 | 14.0 | | 19.0 | 8.0 | | 2.5 | 2.5 | | 10.0 | 7.0 | 3.7 |
| 15 | 25.5 | 11.5 | 14.0 | | 19.0 | 8.0 | | 2.5 | | 2.5 | 10.0 | 7.0 | 3.7 |

EXAMPLE 4

An optical fiber was prepared in the same manner as in Example 2, except that the core glass was doped with 500 ppm $Pr^{3+}$. The resulting optical fiber had an outside diameter of 125 μm, Δn=8%, a core diameter of 1 μm, a cut-off wavelength of 1 μm. Its transmission loss at a wavelength of 1.3 μm was as low as 0.2 dB/m.

Figure 9:
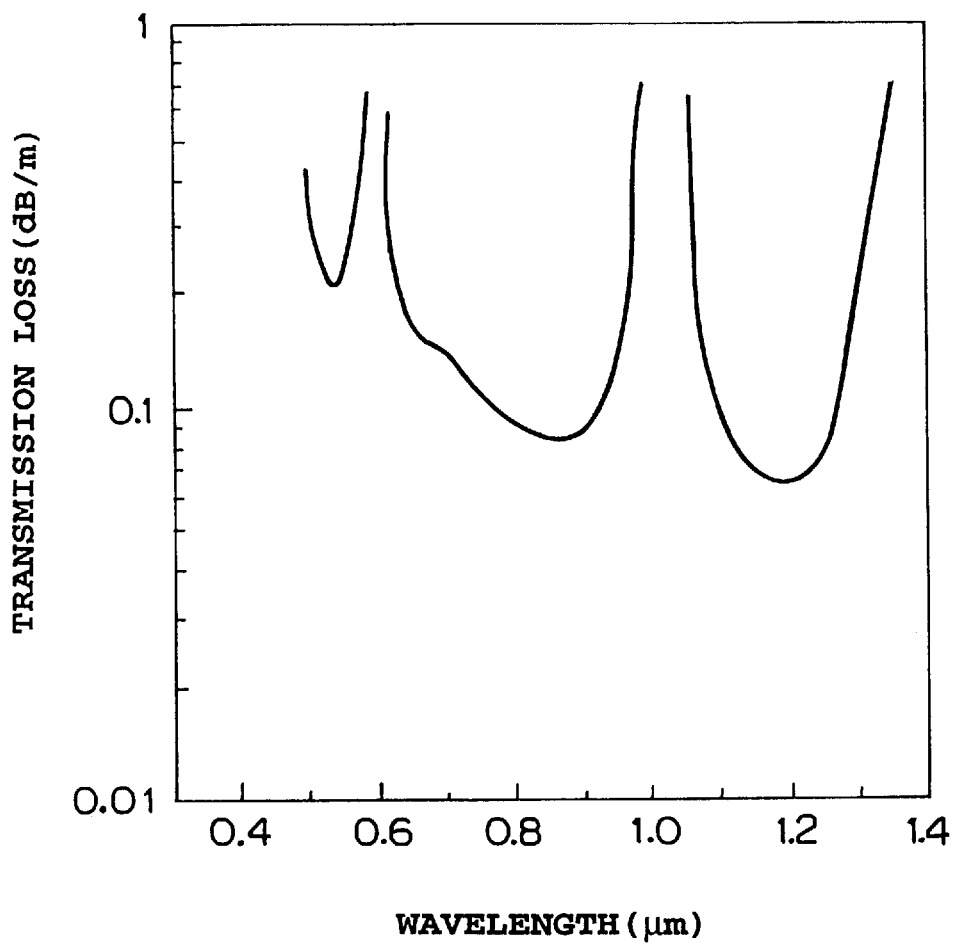
FIG. 9 is a characteristic chart showing the wavelength dependence of transmission loss in another embodiment of the optical fiber of the invention.

A large peak shown in FIG. 9 is an absorption due to $Pr^{3+}$. An amplifier for amplifying signal light with a wavelength of 1.31 μm by pumping with light at a wavelength of 1.017 μm was constructed using the optical fiber obtained in Example 4. A gain coefficient of 0.5 dB/mW was obtained.

Single mode optical fibers of the formulation shown in Table 8 were prepared, whose core glass for the fiber with Δn=2.5% was doped with 1000 ppm $Pr^{3+}$, or the core glass for the fiber with Δn=3.7%, 6.6% or 8% was doped with 500 ppm $Pr^{3+}$. Amplifiers for amplifying the signal light at a wavelength of 1.31 μm, by pumping with a light at a wavelength of 1.017 μm, were constructed using the resulting optical fibers. The optical fiber with Δn=2.5% gave a gain coefficient of 0.25 dB/mW. The optical fiber with Δn=3.7% gave a gain coefficient of 0.3 dB/mW. The optical fiber with Δn=6.6% gave a gain coefficient of 0.4 dB/mW. The optical fiber with Δn=8% gave a gain coefficient of 0.5 dB/mW.

TABLE 8

| Δn | | |
|---|---|---|
| 2.5% | Core | 25.5InF3-11.5GaF3-15ZnF2-12PbF2-18BaF2-8SrF2-2.5YF3-2.5LaF3-5LiF |
| | Kladding | 25.5InF3-11.5GaF3-14ZnF2-2.5PbF2-19BaF2-8SrF2-2.5YF3-2.5LaF3-7.5NaF-7LiF |
| | A First Jacketing Tube | 47.5HfF4-23.5BaF2-2.5LaF3-2YF3-4.5AlF3-20NaF |
| | A second Jacketing Tube | 47.5ZrF4-23.5BaF2-2.5LaF3-2YF3-4.5AlF3-20NaF |
| 2.5% | Core | 25.5InF3-11.5GaF3-15ZnF2-12PbF2-18BaF2-8SrF2-2.5YF3-2.5LaF3-5LiF |
| | Kladding | 25.5InF3-11.5GaF3-14ZnF2-2.5PbF2-19BaF2-8SrF2-2.5YF3-2.5LaF3-7.5NaF-7LiF |
| | A First Jacketing Tube | 25.5InF3-11.5GaF3-14ZnF2-2.5PbF2-19BaF2-8SrF2-2.5YF3-2.5LaF3-7.5NaF-7LiF |
| | A Second Jacketing Tube | 47.5ZrF4-23.5BaF2-2.5LaF3-2YF3-4.5AlF3-20NaF |
| 3.7% | Core | 22InF3-16GaF3-14ZnF2-19PbF2-13BaF2-6SrF2-3YF3-3LaF3-4LiF |
| | Kladding | 25.5InF3-11.5GaF3-14ZnF2-2.5PbF2-19BaF2-8SrF2-2.5YF3-2.5LaF3-7.5NaF-7LiF |
| | A First Jacketing Tube | 47.5HfF4-23.5BaF2-2.5LaF3-2YF3-4.5AlF3-20NaF |
| | A Second Jacketing Tube | 47.5ZrF4-23.5BaF2-2.5LaF3-2YF3-4.5AlF3-20NaF |
| 3.7% | Core | 25.5InF3-11.5GaF3-15ZnF2-12PbF2-18BaF2-8SrF2-2.5YF3-2.5LaF3-5LiF |
| | Kladding | 25.5InF3-11.5GaF3-14ZnF2-19BaF2-8SrF2-2.5YF3-2.5LaF3-10NaF-7LiF |
| | A First Jacketing Tube | 25.5InF3-11.5GaF3-14ZnF2-19BaF2-8SrF2-2.5YF3-2.5LaF3-10NaF-7LiF |
| | A Second Jacketing Tube | 47.5ZrF4-23.5BaF2-2.5LaF3-2YF3-4.5AlF3-20NaF |
| 6.6% | Core | 38PbF2-29GaF3-13InF3-12ZnF2-4YF3-4LaF3 |
| | Kladding | 25.5InF3-11.5GaF3-14ZnF2-2.5PbF2-19BaF2-8SrF2-2.5YF3-2.5LaF3-7.5NaF-7LiF |
| | A First Jacketing Tube | 47.5HfF4-23.5BaF2-2.5LaF3-2YF3-4.5AlF3-20NaF |
| | A Second Jacketing Tube | 47.5ZrF4-23.5BaF2-2.5LaF3-2YF3-4.5AlF3-20NaF |
| 8.0% | Core | 38PbF2-29GaF3-13InF3-12ZnF2-4YF3-4LaF3 |
| | Kladding | 25.5InF3-11.5GaF3-14ZnF2-19BaF2-8SrF2-2.5YF3-2.5LaF3-10NaF-7LiF |
| | A First Jacketing Tube | 25.5InF3-11.5GaF3-14ZnF2-19BaF2-8SrF2-2.5YF3-2.5LaF3-10NaF-7LiF |
| | A Second Jacketing Tube | 47.5ZrF4-23.5BaF2-2.5LaF3-2YF3-4.5AlF3-20NaF |

COMPARATIVE EXAMPLE 3

A comparative optical fiber was prepared in the same manner as in Example 2 using as the core glass 500 ppm $PrF_3$-doped $ZrF_4$-based fluoride glass with the composition 50 $ZrF_4$-15 $BaF_2$-3.5 $LaF_3$-10 $PbF_2$-2 $YF_3$-2.5 $AlF_3$-10 LiF-7 NaF (mol %), and as the cladding glass $ZrF_4$-based fluoride glass with the composition 47.5 ZrF$_4$-23.5 BaF$_2$-2.5 LaF$_3$-2 YF$_3$-4.5 AlF$_3$-20 NaF (mol %).

The resulting optical fiber was a single mode fiber having a Δn of 3.7%, a core diameter of 1.7 μm, and a cut-off wavelength of 0.95 μm, and its transmission loss at a wavelength of 1.3 μm was as low as 0.2 dB/m. An amplifier of signal light with a wavelength of 1.31 μm by pumping with light at a wavelength of 1.017 μm was constructed using the optical fiber obtained in Comparative Example 3. A gain coefficient of 0.2 dB/mW was obtained.

A gain coefficient obtained with the high Δn fiber (Δn=6.1%) according to the reported Japanese Patent Application No. 5-281112 was 0.25 dB/mW, which was inferior to the gain coefficient of the claimed fluoride fiber.

EXAMPLE 5

Optical fibers were prepared in the same manner as in Example 2, except that the combination of the core glass composition and the cladding glass composition was changed as in Table 9, and that each core glass was doped with the rare earth ions shown in Table 9. The transmission spectra of the resulting optical fibers were measured for optical loss. The results revealed the increase in transmission loss at the absorption wavelength of the doped rare earth ions.

TABLE 9

| No | Doper Rare Earth Ion | Composition of Glass for Core |  |  |  |  |  |  |  |
|---|---|---|---|---|---|---|---|---|---|
|  |  | InF3 | GaF3 | ZnF2 | PbF2 | CdF2 | YF3 | LaF3 | * |
| 1 | Pr | 13.0 | 29.0 | 16.0 | 34.0 |  | 4.0 | 4.0 | 1.5914 |
| 2 | Pr, Yb | 13.0 | 29.0 | 12.0 | 38.0 |  | 4.0 | 4.0 | 1.578 |
| 3 | Tm | 13.0 | 29.0 | 12.0 | 35.0 | 3.0 | 4.0 | 4.0 | 1.5778 |
| 4 | Tm, Ho, Eu | 13.0 | 29.0 | 16.0 | 34.0 |  | 4.0 | 4.0 | 1.5797 |
| 5 | Nd | 13.0 | 29.0 | 12.0 | 35.0 | 3.0 | 4.0 | 4.0 | 1.5778 |
| 6 | Er | 13.0 | 29.0 | 12.0 | 35.0 | 3.0 | 4.0 | 4.0 | 1.5778 |
| 7 | Er, Yb | 17.0 | 17.0 | 16.0 | 35.0 | 3.0 | 12.0 |  | 1.598 |
| 8 | Pr, Nd | 13.0 | 33.0 | 12.0 | 34.0 |  | 4.0 | 4.0 | 1.563 |
| 9 | Ce | 17.0 | 23.0 | 10.0 | 39.0 | 3.0 | 8.0 |  | 1.597 |
| 10 | Pm | 13.0 | 29.0 | 12.0 | 35.0 | 3.0 | 4.0 | 4.0 | 1.5778 |
| 11 | Sm | 13.0 | 25.0 | 16.0 | 38.0 |  | 4.0 | 4.0 | 1.5965 |
| 12 | Sm, Eu | 13.0 | 33.0 | 16.0 | 30.0 |  | 4.0 | 4.0 | 1.568 |
| 13 | Tb | 13.0 | 33.0 | 16.0 | 34.0 |  |  | 4.0 | 1.587 |
| 14 | Dy | 13.0 | 29.0 | 12.0 | 35.0 | 3.0 | 4.0 | 4.0 | 1.5778 |
| 15 | Dy, Yb | 17.0 | 17.0 | 8.0 | 39.0 | 7.0 | 12.0 |  | 1.586 |
| 16 | Dy, Er | 13.0 | 25.0 | 12.0 | 42.0 |  | 4.0 | 4.0 | 1.6077 |
| 17 | Yb | 17.0 | 21.0 | 8.0 | 39.0 | 3.0 | 12.0 |  | 1.6071 |
| 18 | Eu | 17.0 | 25.0 | 8.0 | 39.0 | 3.0 | 8.0 |  | 1.602 |
| 19 | Dy, Pr | 17.0 | 21.0 | 12.0 | 39.0 | 3.0 | 8.0 |  | 1.604 |
| 20 | Nd, Yb | 13.0 | 21.0 | 16.0 | 39.0 | 3.0 | 8.0 |  | 1.5821 |
| 21 | Er, Tm | 13.0 | 29.0 | 12.0 | 35.0 | 3.0 | 4.0 | 4.0 | 1.5778 |
| 22 | Pr | 13.0 | 33.0 | 12.0 | 34.0 |  | 4.0 | 4.0 | 1.563 |

| No | Doper Rare Earth Ion | Composition of Glass for Cladding |  |  |  |  |  |  |  |  |  | * | Δn |
|---|---|---|---|---|---|---|---|---|---|---|---|---|---|
|  |  | InF3 | GaF3 | ZnF2 | PbF2 | BaF2 | SrF2 | YF3 | LaF | NaF | LiF |  |  |
| 1 | Pr | 25.0 | 15.0 | 16.0 | 10.0 | 14.0 | 10.0 | 5.0 |  |  | 5.0 | 1.5136 | 4.9 |
| 2 | Pr, Yb | 30.0 | 10.0 | 16.0 | 10.0 | 14.0 | 10.0 | 5.0 |  |  | 5.0 | 1.5195 | 3.7 |
| 3 | Tm | 25.0 | 15.0 | 16.0 |  | 18.0 | 6.0 | 5.0 |  | 10.0 | 5.0 | 1.4705 | 6.8 |
| 4 | Tm, Ho, Eu | 25.0 | 19.0 | 12.0 | 10.0 | 14.0 | 10.0 | 5.0 |  |  | 5.0 | 1.506 | 4.7 |
| 5 | Nd | 26.0 | 11.0 | 15.0 | 12.0 | 16.0 | 10.0 | 5.0 |  |  | 5.0 | 1.5175 | 3.8 |
| 6 | Er | 26.0 | 11.0 | 13.0 | 12.0 | 18.0 | 10.0 | 5.0 |  |  | 5.0 | 1.5182 | 3.8 |
| 7 | Er, Yb | 26.0 | 11.0 | 17.0 | 14.0 | 12.0 | 10.0 | 5.0 |  |  | 5.0 | 1.5237 | 4.6 |
| 8 | Pr, Nd | 26.0 | 11.0 | 17.0 | 16.0 | 10.0 | 10.0 | 5.0 |  |  | 5.0 | 1.5306 | 2.1 |
| 9 | Ce | 26.0 | 11.0 | 17.0 |  | 18.0 | 6.0 | 5.0 |  | 12.0 | 5.0 | 1.469 | 8.0 |
| 10 | Pm | 26.0 | 11.0 | 17.0 |  | 16.0 | 6.0 | 5.0 |  | 14.0 | 5.0 | 1.4635 | 7.2 |
| 11 | Sm | 24.0 | 13.0 | 17.0 | 14.0 | 12.0 | 10.0 | 5.0 |  |  | 5.0 | 1.5255 | 4.4 |
| 12 | Sm, Eu | 28.0 | 9.0 | 17.0 | 14.0 | 12.0 | 10.0 | 5.0 |  |  | 5.0 | 1.5294 | 2.5 |
| 13 | Tb | 25.5 | 10.5 | 16.5 | 14.5 | 12.5 | 10.5 | 4.5 |  |  | 5.5 | 1.5265 | 3.8 |
| 14 | Dy | 27.5 | 8.5 | 16.5 | 14.5 | 12.5 | 10.5 | 4.5 |  |  | 5.5 | 1.5302 | 3.0 |
| 15 | Dy, Yb | 28.0 | 9.0 | 17.0 | 12.0 | 14.0 | 10.0 | 5.0 |  |  | 5.0 | 1.5211 | 4.1 |
| 16 | Dy, Er | 28.0 | 9.0 | 17.0 | 10.0 | 16.0 | 10.0 | 5.0 |  |  | 5.0 | 1.5165 | 5.7 |
| 17 | Yb | 28.0 | 9.0 | 17.0 | 14.0 | 12.0 | 10.0 | 5.0 |  |  | 5.0 | 1.5275 | 5.0 |
| 18 | Eu | 28.0 | 9.0 | 17.0 | 12.0 | 16.0 | 8.0 | 5.0 |  |  | 5.0 | 1.5225 | 5.0 |
| 19 | Dy, Pr | 28.0 | 9.0 | 17.0 | 14.0 | 12.0 | 10.0 | 2.5 | 2.5 |  | 5.0 | 1.5305 | 4.6 |
| 20 | Nd, Yb | 25.5 | 11.5 | 17.0 | 14.0 | 12.0 | 10.0 | 2.5 | 2.5 |  | 5.0 | 1.5282 | 3.4 |
| 21 | Er, Tm | 25.0 | 15.0 | 16.0 | 10.0 | 14.0 | 10.0 | 5.0 |  |  | 5.0 | 1.514 | 4.1 |
| 22 | Pr | 26.0 | 11.0 | 17.0 | 20.0 | 10.0 | 6.0 | 5.0 |  |  | 5.0 | 1.548 | 1.0 |

* Refractive Index

A comparison between Example 4 and Comparative Example 3 showed that the use of the claimed fluoride fiber suppressed the nonradiative relaxation of Pr$^{3+}$, increasing the emission efficiency.

EXAMPLE 6

Optical fibers were prepared in the same manner as in Example 2, except that the combination of the core glass composition and the cladding glass composition was changed as in Tables 10 and 11, and that each core glass was doped with the rare earth ions shown in Tables 10 and 11. The transmission spectra of the resulting optical fibers were measured for optical loss. The results revealed the increase in transmission loss at the absorption wavelength of the doped rare earth ions.

vided for the relative refractive index differences of 2.5%, 3.7%, 6.6% and 8%. In Table 8, it should be noted that the amounts of the substituted $PbF_2$ and the substituting NaF were adjusted to bring the refractive index of the cladding

TABLE 10

| No. | Doped Rare Earth Ion | | Glass Composition for Optical Fibre (mol %) | | | | | | | | | | |
|---|---|---|---|---|---|---|---|---|---|---|---|---|---|
| | | | InF3 | GaF3 | ZnF2 | PbF2 | BaF2 | SrF2 | CdF2 | YF3 | LaF3 | GdF3 | LiF | NaF |
| 1 | Pr, 1000 ppm | Core | 13.0 | 29.0 | 16.0 | 34.0 | | | | 4.0 | 4.0 | | | |
| | | Cladding | 29.0 | 8.0 | 15.0 | | 14.0 | 4.0 | | 2.5 | 2.5 | | 5.0 | 20 |
| 2 | Nd, 1000 ppm | Core | 13.0 | 29.0 | 12.0 | 38.0 | | | | 4.0 | 4.0 | | | |
| | | Cladding | 29.0 | 8.0 | 15.0 | | 14.0 | 4.0 | | 2.5 | 2.5 | | 5.0 | 20 |
| 3 | Tm, 1000 ppm Yb, 4000 ppm | Core | 13.0 | 29.0 | 12.0 | 35.0 | | | 3.0 | 4.0 | 4.0 | | | |
| | | Cladding | 25.5 | 11.5 | 15.0 | | 18.0 | 8.0 | | 2.5 | 2.5 | | 5.0 | 12.0 |
| 4 | Tm, 1000 ppm | Core | 13.0 | 25.0 | 16.0 | 38.0 | | | | 4.0 | 4.0 | | | |
| | | Cladding | 26.0 | 8.0 | 17.0 | | 19.0 | 8.0 | | 2.5 | 2.5 | | 5.0 | 12.0 |
| 5 | Ho, 1000 ppm | Core | 13.0 | 33.0 | 12.0 | 34.0 | | | | 4.0 | 4.0 | | | |
| | | Cladding | 25.5 | 11.5 | 15.0 | | 18.0 | 8.0 | | 2.5 | 2.5 | | 5.0 | 12.0 |
| 6 | Er, 2000 ppm | Core | 13.0 | 29.0 | 12.0 | 38.0 | | | | 4.0 | | 4.0 | | |
| | | Cladding | 25.5 | 11.5 | 15.0 | 5.0 | 18.0 | 8.0 | | 2.5 | 2.5 | | 5.0 | 7.0 |
| 7 | Tm, 0.5 wt % Ho, 1 wt % | Core | 13.0 | 29.0 | 12.0 | 38.0 | | | | 4.0 | 4.0 | | | |
| | | Cladding | 25.5 | 11.5 | 15.0 | 2.5 | 18.0 | 8.0 | | 2.5 | 2.5 | | 5.0 | 9.5 |
| 8 | Tm, 2000 ppm Tb, 4000 ppm | Core | 13.0 | 29.0 | 12.0 | 38.0 | | | | 4.0 | 4.0 | | | |
| | | Cladding | 25.5 | 11.5 | 15.0 | 12.0 | 18.0 | 8.0 | | 2.5 | 2.5 | | 5.0 | |
| 9 | Pr, 500 ppm | Core | 13.0 | 29.0 | 16.0 | 34.0 | | | | 4.0 | 4.0 | | | |
| | | Cladding | 25.5 | 11.5 | 15.0 | | 18.0 | 8.0 | | 2.5 | 2.5 | | 5.0 | 12.0 |
| 10 | Pr, 2000 ppm | Core | 13.0 | 29.0 | 16.0 | 34.0 | | | | 4.0 | 4.0 | | | |
| | | Cladding | 25.5 | 11.5 | 15.0 | | 18.0 | 8.0 | | 2.5 | 2.5 | | 5.0 | 12.0 |
| 11 | Er, 1000 ppm | Core | 13.0 | 29.0 | 15.0 | 34.0 | | | | 4.0 | 4.0 | | | |
| | | Cladding | 25.5 | 11.5 | 16.0 | | 18.0 | 8.0 | | 2.5 | 2.5 | | 5.0 | 12.0 |
| 12 | Nd, 2000 ppm | Core | 13.0 | 29.0 | 12.0 | 38.0 | | | | 4.0 | 4.0 | | | |
| | | Cladding | 29.0 | 8.0 | 15.0 | | 18.0 | 8.0 | | 2.5 | 2.5 | | 5.0 | 12 |

TABLE 11

| No. | Doped Rare Earth Ion | | Glass Composition for Optical Fibre (mol %) | | | | | | | | | |
|---|---|---|---|---|---|---|---|---|---|---|---|---|
| | | | InF3 | GaF3 | ZnF2 | PbF2 | BaF2 | SrF2 | LaF3 | YF3 | NaF | LiF |
| 1 | Pr, 1000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | 2.5 | 19.0 | 8.0 | 2.5 | 2.5 | 7.5 | 7.0 |
| 2 | Nd, 1000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | 2.5 | 19.0 | 8.0 | 2.5 | 2.5 | 7.5 | 7.0 |
| 3 | Tm, 1000 ppm Yb, 4000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 4 | Tm, 1000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 5 | Ho, 1000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 6 | Er, 2000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 7 | Tm, 0.5 wt % Ho, 1 wt % | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 8 | Tm, 2000 ppm Tb, 4000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 9 | Pr, 500 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 10 | Pr, 2000 ppm | Clore | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 11 | Er, 1000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |
| 12 | Nd, 2000 ppm | Core | 25.5 | 11.5 | 15.0 | 12.0 | 18.0 | 8.0 | 2.5 | 2.5 | | 5.0 |
| | | Cladding | 25.5 | 11.5 | 14.0 | | 19.0 | 8.0 | 2.5 | 2.5 | 10.0 | 7.0 |

EXAMPLE 7

Table 8 shows combinations of the optimal glass compositions for the core, cladding and jacketing tubes of the claimed single mode optical fiber, the combinations provided into agreement with the refractive index of the first jacketing tube for which the composition of the cladding glass was used.

EXAMPLE 8

2 Meters of the optical fiber No. 3 shown in Tables 10 and 11, a fiber doped with 1000 ppm of Tm and 4000 ppm of Yb as rare earth ions, was used to construct an optical fiber laser. Each end of the rare earth ion-doped optical fiber was butted to a dielectric mirror to form a Fabry-Perot laser cavity. A Nd-YAG laser operating at 1.12 μm was used as a pump source. Light from this pump source was focused by a lens onto the fiber end. The dielectric mirror with the transparent to the pump wavelength and highly reflective to the lasing wavelength of 450 to 500 nm was used. The optical fiber laser with this arrangement gave blue laser oscillations at wavelengths 455 nm and 480 nm.

EXAMPLE 9

2 Meters of the optical fiber No. 4 shown in Tables 10 and 11, a fiber doped with 1000 ppm of Tm as rare earth ions, was used to construct the same laser cavity as in Example 8. The pump source was a krypton ion laser, and the pump wavelengths were 647 nm and 676 nm. The dielectric mirror with the transparent to the pump wavelengths and highly reflective to the lasing wavelength of 450 to 500 nm was used. The optical fiber laser in this configuration gave blue laser oscillations at wavelengths 455 nm and 480 nm similar to Example 8. Furthermore, a high output power LD, operating at 1.48 μm, was added to the pump source of Example 9, so that two wavelength pumping involving 647 nm and 1.48 μm was performed to increase a blue laser output power.

EXAMPLE 10

2 Meters of the optical fiber No. 6 shown in Tables 10 and 11, a fiber doped with 2000 ppm of Er as rare earth ions, was used to construct the same laser cavity as in Example 7. The pump source was a laser diode operating at 0.8 μm or 0.98 μm, and the mirror was one highly reflective to the lasing wavelength of 540 to 545 nm. The optical fiber laser in this configuration gave green laser oscillation at wavelength 540 nm.

Laser oscillations were also observed at wavelength 412 nm in the fiber (No. 2, 12) doped with Nd as rare earth ions, at wavelength 492 nm in the fiber (No. 1, 10) doped with Pr, and at wavelength 549 nm in the fiber (No. 5) doped with Ho.

EXAMPLE 11

10 Meters of the optical fiber No. 11 shown in Tables 10 and 11, a fiber doped with 1000 ppm of Er as rare earth ions, was used to construct a 1.5 μm-band optical amplifier. That is, signal light (wavelength 1.55 μm) and pump light (wavelength 1.48 μm) from LDs were combined by a WDM fiber coupler, and launched into the fiber end. An output signal was obtained from the output end via an optical isolator. A gain of more than 25 dB was obtained throughout the wavelength band of 1530 to 1560 nm with a pump power of 150 mW.

EXAMPLE 12

The optical fiber No. 7 shown in Tables 10 and 11, a fiber doped with 0.5 wt. % Tm and 1 wt. % Ho as rare earth ions, was used to construct a 1.4 μm-band optical amplifier. The pump source was a laser diode operating at 0.8 μm. A gain of 20 dB was obtained with a pump power of 100 mW.

EXAMPLE 13

The optical fiber No. 8 shown in Tables 10 and 11, a fiber doped with 2000 ppm of Tm and 4000 ppm of Tb as rare earth ions, was used to construct a 1.65 μm-band optical amplifier. The pump source was a laser diode operating at 1.2 μm. A gain of 20 dB was obtained with a pump power of 100 mW.

EXAMPLE 14

20 meters of optical fiber No. 9 shown in Tables 10 and 11 was used to construct a 1.3 μm-band optical amplifier. The pump source was a laser diode operating at 0.98 μm. A gain of 20 dB was obtained with a pump power of 200 mW.

The present invention has been described in detail with respect to various embodiments, and it will now be apparent from the foregoing to those skilled in the art tat changes and modifications may be made without departing from the invention in its broader aspects, and it is our intention, therefore, in the appended claims to cover all such changes and modifications as fall within the true spirit of the invention.

As is apparent from the foregoing description, the present invention has succeeded in providing fluoride glass having satisfactory infrared transmission. The invention has also permitted the production of an optical fiber for optical amplification with low loss and high efficiency (Δn). Thus, the invention has made it possible to increase the gain coefficient and the effective gain, and to construct an optical amplifier for semiconductor laser pumping essential for practical use. Furthermore, the invention provides the advantages of lowering the cost of and raising the performance of optical communication systems.

What is claimed is:

1. Fluoride glass comprising 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of LiF, 0 to 30 mol % of NaF, and 0 to 15 mol % of an additive, with the total amount of all components being 100 mol %.

2. A fluoride optical fiber having a core and a cladding, wherein the matrix of said cladding comprises 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of LiF, 0 to 30 mol % of NaF, and 0 to 15 mol % of an additive, with the total amount of all components being 100 mol %.

3. The fluoride optical fiber of claim 2, wherein the matrix of said core comprises 5 to 25 mol % of $InF_3$, 13 to 40 mol % of $GaF_3$, 4 to 25 mol % of $ZnF_2$, 30 to 46 mol % of $PbF_2$, 0 to 20 mol % of $CdF_2$, and 1.5 to 12 mol % of at least one member selected from the group consisting of $LaF_3$, $YF_3$, $GdF_3$ and $LuF_3$, and 0 to 15 mol % of an additive, with the total amount of all components being 100 mol %.

4. The fluoride optical fiber of claim 2, wherein the matrix of said core comprises 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of LiF, 0 to 30 mol % of NaF, and 0 to 15 mol % of an additive, with the total amount of all components being 100 mol %.

5. The fluoride optical fiber of claim 2, wherein transition metal ions or rare earth ions are contained in said core, and the relative refractive index difference Δn between said core and said cladding is not less than 1.0%.

6. The fluoride optical fiber of claim 2, wherein at least one type selected from $Ce^{3+}$, $Pr^{3+}$, $Nd^{3+}$, $Pm^{3+}Sm^{3+}$, $Eu^{3+}$, $Tb^{3+}$, $Dy^{3+}$, $Ho^{3+}$, $Er^{3+}$, $Tm^{3+}$ and $Yb^{3+}$ is contained as said rare earth ions.

7. A fluoride optical fiber having a core, a first cladding, and a second cladding on the outer periphery of said first cladding, wherein the matrix of said first cladding comprises 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of LiF, 0 to 30 mol % of NaF, and 0 to 15 mol % of an additive, with the total amount of all components being 100 mol %; and the matrix of said second cladding comprises 10 to 30 mol % of $InF_3$, 7 to 30 mol % of $GaF_3$, 10 to 19 mol % of $ZnF_2$, 4 to 30 mol % of $BaF_2$, 0 to 24 mol % of $SrF_2$, 0 to 30 mol % of $PbF_2$, and 1.5 to 10 mol % of at least one member selected from the group consisting of $LaF_3$, $YF_3$, $GdF_3$ and $LuF_3$, 1.5 to 30 mol % of LiF, 0 to 30 mol % of NaF, and 0 to 15 mol % of an additive, with the total amount of all components being 100 mol %.

8. The fluoride optical fiber of claim 7, wherein said matrix of said second cladding comprises fluoride glass comprising at least one fluoride from $ZrF_4$ and $HfF_4$ and at least one member of the group consisting of $BaF_2$, $LaF_3$, $GdF_3$, $YF_3$, LiF, NaF, $PbF_2$ and $AlF_3$.

9. The fluoride optical fiber of claim 7, wherein the refractive index of said first cladding is adjusted such that the refractive index of said first cladding is consistent with the refractive index of said second cladding, or the refractive index of said first cladding is larger than the refractive index of said second cladding but smaller than the refractive index of said core.

10. The fluoride optical fiber of claim 9, wherein the adjustment of the refractive index of said first cladding is performed by substituting part of the $PbF_2$ in said matrix of said first cladding by NaF.

11. The fluoride optical fiber of claim 8, wherein the refractive index of said first cladding is adjusted such that the refractive index of said first cladding is consistent with the refractive index of said second cladding, or the refractive index of said first cladding is larger than the refractive index of second cladding but smaller than the refractive index of said core.

* * * * *

UNITED STATES PATENT AND TRADEMARK OFFICE
CERTIFICATE OF CORRECTION

PATENT NO. : 5,774,620
DATED : June 30, 1998
INVENTOR(S) : Yoshiki Nishida et al.

It is certified that error appears in the above-identified patent and that said Letters Patent is hereby corrected as shown below:

<u>Title page,</u>
Please add item [30],
--      Foreign Application Priority Data
January 30, 1996     [JP]  Japan............................ 013,640/1996
November 18, 1996    [JP]  Japan............................ 306,809/1996 --

Signed and Sealed this

Twenty-fifth Day of March, 2003

JAMES E. ROGAN
*Director of the United States Patent and Trademark Office*